(12) United States Patent
Singh et al.

(10) Patent No.: US 11,079,906 B1
(45) Date of Patent: Aug. 3, 2021

(54) MANAGING USER INTERFACE ITEMS IN A VISUAL USER INTERFACE (VUI)

(71) Applicants: Gaganpreet Singh, Markham (CA); Qiang Xu, Thornhill (CA); Wei Li, Markham (CA)

(72) Inventors: Gaganpreet Singh, Markham (CA); Qiang Xu, Thornhill (CA); Wei Li, Markham (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/063,332

(22) Filed: Oct. 5, 2020

(51) Int. Cl.
*G06F 3/0482* (2013.01)
*G06F 3/0485* (2013.01)
*G06F 3/14* (2006.01)
*G06F 3/0488* (2013.01)

(52) U.S. Cl.
CPC .......... *G06F 3/0482* (2013.01); *G06F 3/0485* (2013.01); *G06F 3/14* (2013.01); *G06F 3/04883* (2013.01)

(58) Field of Classification Search
None
See application file for complete search history.

(56) References Cited

U.S. PATENT DOCUMENTS

| 5,920,316 A | 7/1999 | Oran et al. | |
| 2011/0271217 A1* | 11/2011 | Cruz Moreno | G06F 3/0482 715/765 |
| 2015/0195345 A1* | 7/2015 | Burrows | G06Q 10/06393 715/739 |
| 2015/0339050 A1* | 11/2015 | Vong | G06F 3/03545 345/173 |
| 2017/0160884 A1* | 6/2017 | Son | G06F 3/0482 |
| 2017/0169125 A1* | 6/2017 | Greco | G06F 3/0485 |
| 2017/0336926 A1* | 11/2017 | Chaudhri | H04L 51/22 |
| 2018/0107640 A1* | 4/2018 | Steele | G06F 3/04855 |
| 2020/0159372 A1* | 5/2020 | Bates | G06F 3/0486 |
| 2020/0310591 A1* | 10/2020 | Nakashima | G06F 3/04817 |

OTHER PUBLICATIONS

May.northwind, Manual reordering of items inside a ListView, Code Project, https://www.codeproject.com/Articles/14487/Manual-reordering-of-items-inside-a-ListView?display=Print, 6 pages, Jan. 9, 2008.

(Continued)

*Primary Examiner* — Toan H Vu

(57) ABSTRACT

A method of managing user interface items in a visual user interface (VUI) is disclosed. In one aspect, the method comprises displaying a VUI screen on a display. The VUI screen comprises a scrollable area comprising a plurality of selectable items. The VUI screen provides a pin holder located at an edge of a display area of the display. The state of the pin holder and the second pin holder persists in response to changes in a visual state of the scrollable area. A selected item in the plurality of selectable items is pinned to the pin holder in response to detection of a pinning command. A visual state of the scrollable area is changed in response to detection of corresponding input. A pinned item corresponding to a selected pin from the pin holder is unpinned in response to detection of an unpinning command.

20 Claims, 21 Drawing Sheets

(56) References Cited

OTHER PUBLICATIONS

C. Chen et al., BezelCopy: An Efficient Cross-application Copy-paste Technique for Touchscreen Smartphones, In Proceedings of the 2014 International Working Conference on Advanced Visual Interfaces (AVI '14), pp. 185-192, https://doi.org/10.1145/2598153.2598162, 2014.

Kurosawa et al., Spatial Arrangement of Data and Commands at Bezels of Mobile Touchscreen Devices. In Human-Computer Interaction: Interaction Technologies (Lecture Notes in Computer Science), pp. 227-237, 2015.

V. Roth et al., Bezel Swipe: Conflict-free Scrolling and Multiple Selection on Mobile Touch Screen Devices, In Proceedings of the SIGCHI Conference on Human Factors in Computing Systems (CHI '09), pp. 1523-1526, https://doi.org/10.1145/1518701.1518933, 2009.

Native Clipboard Manager, at least as early as Apr. 15, 2017, 4 pages. https://apkpure.com/native-clipboard-manager/com.dhm47.nativeclipboard.

Smart Multi Clipboard Android App, at least as early as Jan. 25, 2020, https://smartmulticlipboard.com/, 15 pages.

Copy Bubble—Apps on Google Play, at least as early as Jan. 20, 2020, https://play.google.com/store/apps/details?id=com.copybubble&hl=en, 3 pages.

Free Multi Clipboard Manager — Apps on Google Play, at least as early as Jan. 3, 2019, https://play.google.com/store/apps/details?id=com.cv.copybubble&hl=en_CA, 4 pages.

Easy Copy+ The smart Clipboard—Apps on Google Play, at least as early as Nov. 25, 2018, https://play.google.com/store/apps/details?id=com.camel.corp.easycopyplus&hl=en_CA, 5 pages.

Summary of Video: Marian Grzesik, ReorderListView, Jun 8, 2015, https://www.youtube.com/watch?v=BoTUAgPZE8w, 1 page.

* cited by examiner

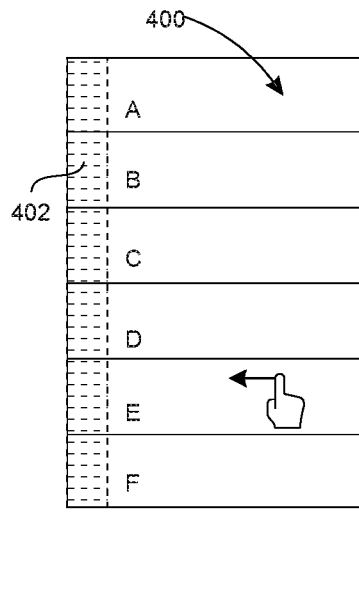 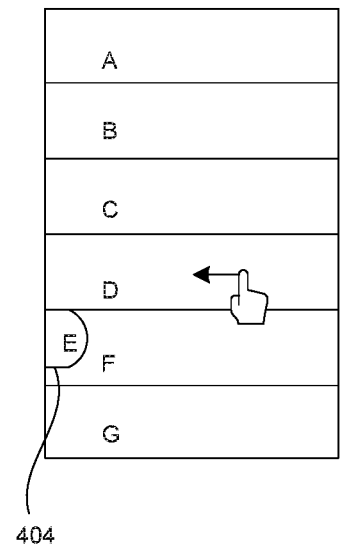 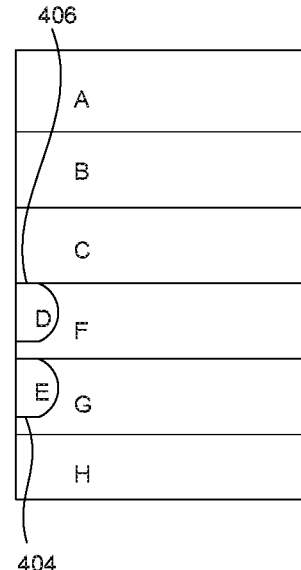
FIG. 4A  FIG. 4B  FIG. 4C
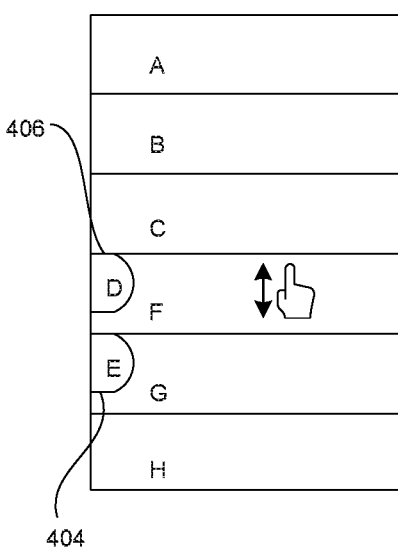 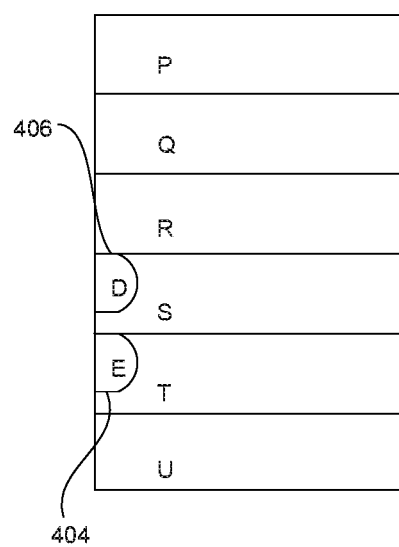
FIG. 4D  FIG. 4E

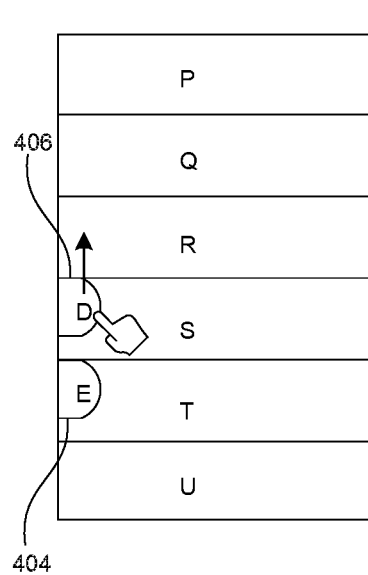
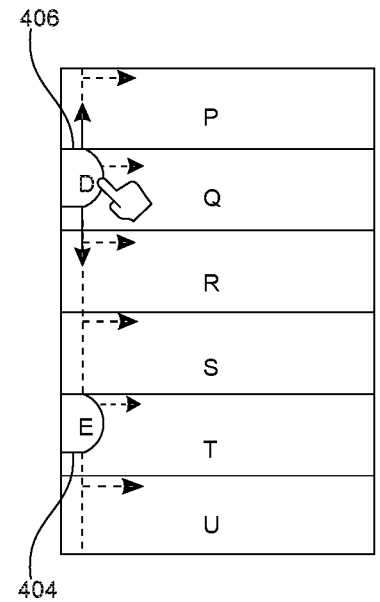
FIG. 4F          FIG. 4G
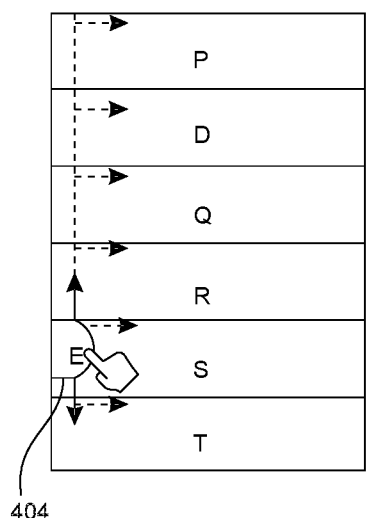
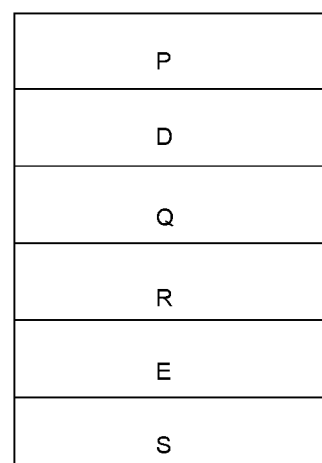
FIG. 4H          FIG. 4I

US 11,079,906 B1

MANAGING USER INTERFACE ITEMS IN A VISUAL USER INTERFACE (VUI)

TECHNICAL FIELD

The present disclosure relates generally to visual user interfaces, and more particularly to managing user interface items.

BACKGROUND

Scrollable lists are a well-known feature of mobile operating systems. Each mobile operating system has its own interaction technique for reordering a list item (i.e., changing a position of an item in a scrollable list). However, existing interaction techniques do not work well with the long scrollable lists having many items. With long scrollable lists, the interaction typically requires the user to hold the list item while scrolling through the scrollable list by moving the finger to the bottom or upper edge of the screen. This makes the interaction cumbersome and tedious. Often, the user misses the target position and loses the track of the list items. This interaction is typically time consuming because the speed at which the list scrolls while reordering is typically not the normal scrolling speed. Additionally, the interaction is typically limited to re-ordering one list item at a time. Accordingly, there exists a need for improvements in managing user interface items.

BRIEF DESCRIPTION OF THE DRAWINGS

FIGS. 4A-4I illustrate a sequence of pinnable VUI screens in accordance with a first example of a user interaction utilizing the method of FIG. 3.

SUMMARY

Figure 1:
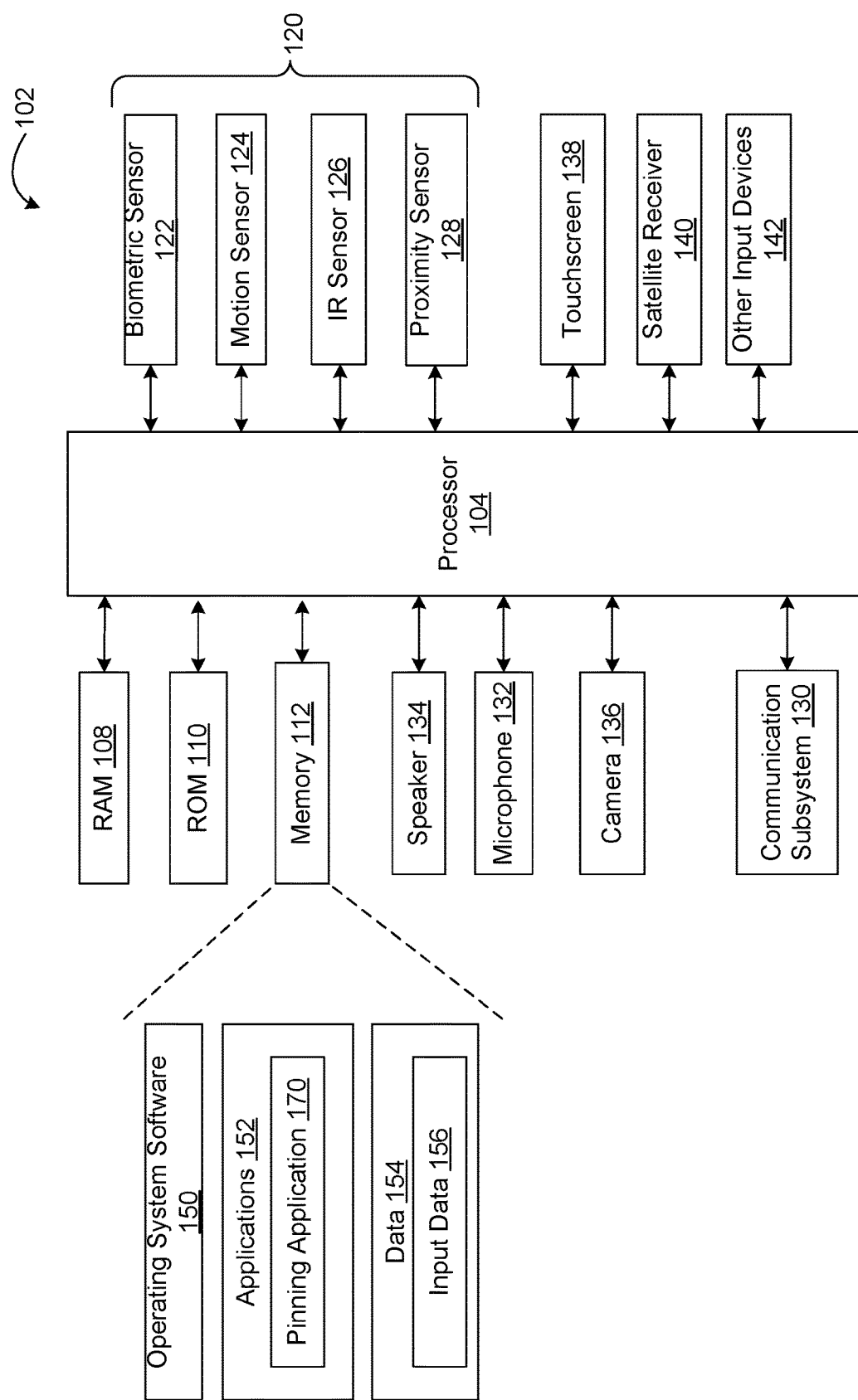
FIG. 1 is a block diagram of a computing device suitable for practicing the teachings of the present disclosure.

The present disclosure provides a method, apparatus and non-transitory machine-readable medium for managing user interface (UI) items in a VUI. The present disclosure provides a pinning method that may be used to reorder UI items in a list (i.e. "list items") displayed in the VUI, preserve a position of list items in a list during a list operation, or to share content between applications via at least one pin holder. The pin holder is provided by a portion of a pinnable VUI screen at one or more edges of a dynamic content area of the pinnable VUI screen, such as a scrollable area, which may include a list. When the dynamic content area is a scrollable area, the pin holder may extend parallel to a scrollable direction of the scrollable area of the pinnable VUI screen. A user may move a list item to the pin holder to pin the list item using a designated gesture, such as a swipe, drag, or long press. The pinned UI item remains attached to the pinned position on the pinnable VUI screen and is unaffected by any change in the visual state of the VUI screen (such as a change in visual state of a list), for example, triggered by scrolling, a list operation such as sorting, or switching between cooperating applications that interact with the pin holder.

The pin holder may form a horizontal bar, a vertical bar, or a frame at the edge of the VUI screen. In some embodiments, the pinning method allows the repositioning of one or multiple UI items (e.g., list items) in a manner that reduces the temporal demands, efforts and the time required compared with present reordering techniques, and improves the accuracy of repositioning UI items when compared with present reordering techniques. The pinning method allows users to put aside the UI items that the user wants to reposition within the dynamic content area (e.g., list), change the visible state of the VUI screen (e.g., such as a list view, grid view or gallery view) by scrolling or performing another operation, and then reposition (e.g., replace, unpin, insert or add) the UI items back to the dynamic content area. The pinned UI items may be repositioned individually, in a group, or all at the same time to the same or different VUI screen from which the UI items were pinned. As noted above, the pinned UI items remain unaffected by the operation that leads to change in the visual state of the VUI screen and may be accessed any time from the positions on the pin holder at which the UI items were pinned. The pins may be repositioned or moved on the pin holder.

In accordance with a first embodiment of a first aspect of the present disclosure, there is provided a method of managing user interface items in a visual user interface (VUI) performed by a processor of a computing device. The method comprises displaying on a display a first VUI screen of a first application. The first VUI screen comprising a dynamic content area comprising selectable content. The first VUI screen provides a first pin holder located at a first side of a display area of the first VUI screen and a second pin holder located at a second side of the display area of the first VUI screen opposite to the right side. The first pin holder and the second pin holder persist across VUI screens of a different applications. The method further comprises pinning selected content from the dynamic content area to the first pin holder or second pin holder in response to detection of a pinning command. Pinning comprises displaying on the display a pin in a corresponding one of the first or second pin holders and storing the selected content in association with the pin in a memory of the computing device. The method further comprises displaying on the display a second VUI screen of a second application in response to detection of input switching the active application from the first application to the second application, wherein the second VUI screen includes an input field. The state of the first pin holder and the second pin holder persists between the first VUI screen of the first application and the second VUI screen of the second application. The method further comprises adding stored content corresponding to one or more pins located in the first or second pin holders to the input field in response to detection of an unpinning command.

In some or all examples of the first embodiment of the first aspect, the first pin holder and second pin holder are provided in response to corresponding input.

In some or all examples of the first embodiment of the first aspect, the first pin holder is located at a left edge of the dynamic content area and the second pin holder is located at a right edge of the dynamic content area.

In some or all examples of the first embodiment of the first aspect, the dynamic content area of the first VUI screen and the input field of the second VUI screen are scrollable in a vertical direction relative to a screen orientation, In some or all examples of the first embodiment of the first aspect, the first pin holder and second pin holder are defined by a vertically extending area at the left edge of the display area of the display and right edge of the display area of the display.

In some or all examples of the first embodiment of the first aspect, the first pin holder and second pin holder are provided without a visual representation.

In some or all examples of the first embodiment of the first aspect, the stored content corresponding to the one or more pins is automatically arranged according to predefined visual layout rules based on a location of the one or more pins in the first or second pin holders.

In some or all examples of the first embodiment of the first aspect, the stored content corresponding to the one or more pins is automatically arranged according to predefined visual layout rules based on a size of the one or more pins in the first or second pin holders.

In some or all examples of the first embodiment of the first aspect, the state of the first pin holder and the second pin holder comprises a location of pins located on the first pin holder and the second pin holder.

In some or all examples of the first embodiment of the first aspect, the state of the first pin holder and the second pin holder comprises a size of pins located on the first pin holder and the second pin holder.

In some or all examples of the first embodiment of the first aspect, the state of the first pin holder and the second pin holder persists in response to changes in a visual state of the dynamic content area and persists across applications.

In some or all examples of the first embodiment of the first aspect, the method further comprises invoking a context-sensitive menu in response to corresponding input associated with a selected pin, wherein the context-sensitive menu comprises a plurality of menu options, and performing an action in response to input selecting an option in the plurality of menu options.

In some or all examples of the first embodiment of the first aspect, the plurality of menu options include a delete option for deleting the selected pin, a visit option for visiting a source associated with the selected pin, and a search option for performing a search for content associated with the selected pin.

In some or all examples of the first embodiment of the first aspect, the method further comprises performing an action in association with stored content corresponding to a pin in response to detection of corresponding input associated with the respective pin.

In accordance with a second embodiment of the first aspect of the present disclosure, there is provided a method of managing user interface items in a visual user interface (VUI) performed by a processor of a computing device. The method comprises displaying a VUI screen on a display. The VUI screen comprises a scrollable area comprising a plurality of selectable items. The VUI screen provides a pin holder located at an edge of a display area of the display. The state of the pin holder and the second pin holder persists in response to changes in a visual state of the scrollable area. A selected item in the plurality of selectable items is pinned to the pin holder in response to detection of a pinning command. A visual state of the scrollable area is changed in response to detection of corresponding input. A pinned item corresponding to a selected pin from the pin holder is unpinned in response to detection of an unpinning command.

In some or all examples of the second embodiment of the first aspect, the pin holder is provided in response to corresponding input.

In some examples of the second embodiment of the first aspect, the selectable items are ordered and arranged one-dimensionally.

In some examples of the second embodiment of the first aspect, the selectable items are ordered and arranged two-dimensionally.

In some or all examples of the second embodiment of the first aspect, the pinning comprises displaying a pin corresponding to the selected item in the pin holder proximate to a location of the selected selectable item, storing the selected item in association with the pin in a memory of the computing device, removing the selected item from the scrollable area, and displaying an additional item that was not previously displayed.

In some or all examples of the second embodiment of the first aspect, the unpinning comprises adding the stored item corresponding to the selected pin to the scrollable area at a position in the scrollable area corresponding to a position of the selected pin, removing a currently displayed item in the scrollable area to accommodate the added item, and removing the selected pin from the pin holder.

In some or all examples of the second embodiment of the first aspect, the selectable items are ordered and arranged in a sequence and the additional item that is displayed is a subsequent item in the sequence.

In some or all examples of the second embodiment of the first aspect, the unpinning comprises inserting the stored item corresponding to the selected pin to the scrollable area at a position in the sequence corresponding to a position of the selected pin, removing a currently displayed item in the sequence to accommodate the inserted item, and removing the selected pin from the pin holder.

In some or all examples of the second embodiment of the first aspect, the currently displayed item that is removed is a last item in the sequence.

In some examples of the second embodiment of the first aspect, the stored item is inserted before the item in the sequence proximate to the position of the pin.

In some examples of the second embodiment of the first aspect, the stored item is inserted after the item in the sequence proximate to the position of the pin.

In some examples of the second embodiment of the first aspect, the pinning command is a designated interaction performed in association with a selectable item, wherein the interaction of the pinning command comprises the detection of a swipe gesture in the direction of the pin holder.

In some examples of the second embodiment of the first aspect, the unpinning command is a designated interaction performed in association with a pin in the pin holder, wherein the interaction of the pinning command comprises the detection of a swipe gesture in a direction of the scrollable area and away from the pin holder.

In some or all examples of the second embodiment of the first aspect, the method further comprises repositioning a pin in the pin holder in response to detection of repositioning input.

In some or all examples of the second embodiment of the first aspect, the repositioning input is a designated interaction performed in association with a pin in the pin holder, wherein the interaction of the pinning command comprises the detection of a drag gesture in a scrollable direction.

In some or all examples of the second embodiment of the first aspect, changing the visual state of the scrollable area comprises scrolling the scrollable area in response to detection of scrolling input.

In some or all examples of the second embodiment of the first aspect, changing the visual state of the scrollable area comprises performing a list operation on the selectable items the scrollable area in response to detection of corresponding input.

In accordance with a first embodiment of a second aspect of the present disclosure, there is provided a computing device providing a display, a memory, and a processor system comprising at least one processor coupled to the display and the memory. The processor system configured to cause the display on of a first VUI screen of a first application. The first VUI screen comprising a dynamic content area comprising selectable content. The first VUI screen provides a first pin holder located at a first side of a display area of the first VUI screen and a second pin holder located at a second side of the display area of the first VUI screen opposite to the right side. The first pin holder and the second pin holder persist across VUI screens of a different applications. The processor system is further configured to pin selected content from the dynamic content area to the first pin holder or second pin holder in response to detection of a pinning command. Pinning comprises displaying on the display a pin in a corresponding one of the first or second pin holders and storing the selected content in association with the pin in a memory of the computing device. The processor system is further configured to cause the display of a second VUI screen of a second application in response to detection of input switching the active application from the first application to the second application, wherein the second VUI screen includes an input field. The state of the first pin holder and the second pin holder persists between the first VUI screen of the first application and the second VUI screen of the second application. The processor system is further configured to add stored content corresponding to one or more pins located in the first or second pin holders to the input field in response to detection of an unpinning command.

In accordance with a second embodiment of the second aspect of the present disclosure, there is provided a computing device providing a display, a memory, and a processor system comprising at least one processor coupled to the display and the memory. The processor system configured to cause the display of a VUI screen on a display. The VUI screen comprises a scrollable area comprising a plurality of selectable items. The VUI screen provides a pin holder located at an edge of a display area of the display. The state of the pin holder and the second pin holder persists in response to changes in a visual state of the scrollable area. The processor system is further configured to pin a selected item in the plurality of selectable items to the pin holder in response to detection of a pinning command. The processor system is further configured to cause a change a visual state of the scrollable area in response to detection of corresponding input. The processor system is further configured to unpin a pinned item corresponding to a selected pin from the pin holder in response to detection of an unpinning command.

In accordance with a first embodiment of a third aspect of the present disclosure, there is provided a non-transitory machine readable medium having tangibly stored thereon executable instructions for execution by a processor system of a computing device. The processing system comprising at least one processor, wherein the executable instructions, in response to execution by the processor system, cause the processor system to cause the display on of a first VUI screen of a first application. The first VUI screen comprising a dynamic content area comprising selectable content. The first VUI screen provides a first pin holder located at a first side of a display area of the first VUI screen and a second pin holder located at a second side of the display area of the first VUI screen opposite to the right side. The first pin holder and the second pin holder persist across VUI screens of a different applications. The processor system is further configured to pin selected content from the dynamic content area to the first pin holder or second pin holder in response to detection of a pinning command. Pinning comprises displaying on the display a pin in a corresponding one of the first or second pin holders and storing the selected content in association with the pin in a memory of the computing device. The processor system is further configured to cause the display of a second VUI screen of a second application in response to detection of input switching the active application from the first application to the second application, wherein the second VUI screen includes an input field. The state of the first pin holder and the second pin holder persists between the first VUI screen of the first application and the second VUI screen of the second application. The processor system is further configured to add stored content corresponding to one or more pins located in the first or second pin holders to the input field in response to detection of an unpinning command.

In accordance with a second embodiment of the third aspect of the present disclosure, there is provided a non-transitory machine readable medium having tangibly stored thereon executable instructions for execution by a processor system of a computing device. The processing system comprising at least one processor, wherein the executable instructions, in response to execution by the processor system, cause the processor system to cause the display of a VUI screen on a display. The VUI screen comprises a scrollable area comprising a plurality of selectable items. The VUI screen provides a pin holder located at an edge of a display area of the display. The state of the pin holder and the second pin holder persists in response to changes in a visual state of the scrollable area. The processor system is further configured to pin a selected item in the plurality of selectable items to the pin holder in response to detection of a pinning command. The processor system is further configured to cause a change a visual state of the scrollable area in response to detection of corresponding input. The processor system is further configured to unpin a pinned item corresponding to a selected pin from the pin holder in response to detection of an unpinning command.

Other aspects and features of the present disclosure will become apparent to those of ordinary skill in the art upon review of the following description of specific implementations of the application in conjunction with the accompanying figures.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Reference is first made to FIG. 1 which illustrates a computing device 102 suitable for practicing the teachings of the present disclosure. The computing device 102 may be a multi-purpose communication device such as a wired or wireless communication device. Examples of the computing device 102 include, but are not limited to, a smartphone, tablet, a personal camera or camera peripheral, a personal computer such as a desktop or laptop computer, smart glasses or other head device mounted display, a smart speaker or other smart or IoT (Internet of Things) device such as a smart appliance, among other possibilities.

The computing device 102 includes a processing system comprising a processor 104 (such as a microprocessor or central processing unit (CPU)) which controls the overall operation of the computing device 102. The processing system may include one or more other types of processors coupled to the processor 104, such as a graphic processing unit (GPU), a tensor processing unit (TPU), a neural processing unit (NPU), an application specific integrated circuit, or a field programmable gate array (FPGA), for offloading certain computing tasks. The processor 104 is coupled to a plurality of components via a communication bus (not shown) which provides a communication path between the components and the processor 104. The processor 104 is coupled to Random Access Memory (RAM) 108, Read Only Memory (ROM) 110, and persistent (non-volatile) memory 112 such as flash memory and a communication subsystem 130. The communication subsystem 130 includes one or more wireless transceivers for exchanging radio frequency signals with wireless networks. The communication subsystem 130 may also include a wireline transceiver for wireline communications with wired networks. The wireless transceivers may include one or a combination of Bluetooth transceiver or other short-range wireless transceiver, a Wi-Fi or other wireless local area network (WLAN) transceiver for communicating with a WLAN via a WLAN access point (AP), or a wireless wide area network (WWAN) transceiver such as a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites which are part of a global or regional satellite navigation system.

The computing device 102 also comprises a microphone 132 and a speaker 134 coupled to the processor 104. The computing device 102 may also comprise a camera 136, a touchscreen 138, and a satellite receiver 140 for receiving satellite signals from a satellite network, depending on the type of the computing device 102. The touchscreen 138 is typically a capacitive touchscreen. The computing device 102 may also comprise a plurality of sensors 120 coupled to the processor 104. The sensors 120 may comprise a biometric sensor 122 such as face scanner or finger print scanner, a motion sensor 124 such as an accelerometer, an infrared (IR) sensor 126, and/or a proximity sensor 128. The sensors 120 may include other sensors (not shown) such as an orientation sensor, electronic compass or altimeter, among possible embodiments. The computing device 102 may also comprise one or more other input devices 142 such as buttons, switches, dials, a keyboard or keypad, or navigation tool, depending on the type of the computing device 102.

Operating system software 150 executable by the processing system, including the processor 104 is stored in the persistent memory 112 but may be stored in other types of memory devices, such as ROM 108 or similar storage element. The operating system software 150 provides a visual user interface (VUI) for user interaction with the computing device 102 in the form of touch inputs detected via the touchscreen 138 and/or other input devices 142. A number of application programs 152 executable by the processing system, including the processor 104 are also stored in the persistent memory 112. The application programs 152 comprises a pinning application 170. Alternatively, the pinning application 170 may be part of the operating system software 150, such as part of the VUI, or an application programming interface (API). The pinning application 170 comprises instructions for enabling a user to manage user interface (UI) items using pinning in accordance with the teachings of the present disclosure, such as the methods 300, 700 and 900.

The memory 112 stores a variety of data 154, including sensor data acquired by the plurality of sensors 120, including sensor data acquired by the biometric sensor 122, sensor data acquired by the motion sensor 124 (i.e. accelerometer, gyroscope, or inertial measurement unit (IMU) of the computing device 102), sensor data acquired by the infrared sensor 126, and sensor data acquired by the proximity sensor 128. The memory 112 also stores input data 156 acquired by the touchscreen 138 and/or other input devices 142, user data including user preferences, settings and possibly biometric data about the user for authentication and/or identification, a download cache including data downloaded via the wireless transceivers, and saved files. System software, software modules, specific device applications, or parts thereof, may be temporarily loaded into RAM 108. Communication signals received by the computing device 102 may also be stored in RAM 108. Although specific functions are described for various types of memory, this is merely one embodiment, and a different assignment of functions to types of memory may be used in other embodiments.

The computing device 102 may also comprise a battery (not shown) as a power source, such as one or more rechargeable batteries that may be charged, for example, through charging circuitry coupled to a battery interface such as the serial data port. The battery provides electrical power to at least some of the components of the computing device 102, and the battery interface (not shown) provides a mechanical and electrical connection for the battery.

FIGS. 2A-2D illustrate configurations of pinnable VUI screens (i.e. pinnable VUI screen configurations) in accordance with various embodiments of the present disclosure. Each of the pinnable VUI screen configurations is displayed on the touchscreen display 138 of the computing device 102 and includes a dynamic content area. The dynamic content area may comprise a scrollable area 202 and one or more pin holders represented by references 204, 206a and 206b, 208, and 210a and 210b in FIGS. 2A-2D respectively. Content may be pinned to one or more of the pin holders. In some examples, all selectable content in the scrollable area 202 is pinnable. In other examples, a subset of the selectable content in the scrollable area 202 is pinnable. Alternatively, the dynamic content area may not be scrollable but may update based on received data from the user or communication subsystem 130.

The pin holder(s) may be parallel to a scrolling direction as shown in FIGS. 2A-2D. The scrollable area 202 is located in the interior (e.g., center) of the pinnable VUI screen and occupies a majority of the pinnable VUI screen. The scrollable area 202 may be scrollable in a vertical direction relative to a screen orientation of the pinnable VUI screen, a horizontal direction relative to the screen orientation of the pinnable VUI screen, or both the vertical direction and horizontal direction relative to the screen orientation of the pinnable VUI screen depending on the embodiment. The scrollable area 202 is used to display dynamic content comprising one or more selectable UI items. The selectable UI items may be list items in a scrollable list, table grid, array or gallery, or other dynamic VUI content such as a web content from a web page or the like, depending on the embodiment. The selectable UI items may comprise a picture, video, audio, alphanumeric text, multimedia object or other suitable logical object.

A pin holder may be located at the left side, right side, top or bottom of the pinnable VUI screen depending on the embodiment. The pin holder may form a horizontal bar (or box), a vertical bar (or box), or a frame depending on the embodiment. The pin holder may be located in the scrollable area 202. For example, the pin holder may be a vertical bar located at the left side or right side of the scrollable area 202, a horizontal bar located at the top or bottom of the scrollable area 202, or a frame at an inner edge of the boundary, border or perimeter of the scrollable area 202. FIGS. 4A-4I illustrate an example in which the pin holder is a vertical bar located at the left side of the scrollable area. Alternatively, rather than the pin holder being located in the scrollable area, the pin holder may be located outside of the scrollable area 202, for example, at an outer edge of the boundary, border or perimeter of the scrollable area 202.

The pin holder is defined by an area of the pinnable VUI screen referred to as the pin holder area. The pin holder may be visible by means of a visual representation as visual affordance for users. Examples of visual representations include a bar, a box or a frame defining the boundary, border or perimeter of the pin holder area. Alternatively, the pin holder may be invisible with no visual representation. For example, the pin holder may be invisible when it is located in the scrollable area 202 of the pinnable VUI screen as shown in the examples of FIGS. 4A-4I.

The pin holder, the scrollable area and the selectable UI items in the scrollable area 202 are touch-sensitive/touch-interactive onscreen UI items that are each defined by, and associated with, a respective touch area on a touch surface of the touchscreen 138 with which a user may interact via touch inputs. The touch area may be defined in terms of the corresponding display pixels of the display device of the touchscreen 138. The touch area may be somewhat larger or smaller than the corresponding display area in which a visual representation of the corresponding onscreen items is displayed on the display of the touchscreen 138.

The pinning application 170, or alternatively the operating system software 150 or an application program 152 with which the pinning application 170 interacts for providing pinning functionality in accordance with the present disclosure, maintains state information about the pinnable VUI screens including the state of the dynamic content area (e.g., scrollable area) and the state of the pin holder(s).

The state information is temporary, runtime information stored in RAM 108 or the like. In some examples, the state of the dynamic content area (e.g., scrollable area) includes a current order of list items in a scrollable list displayed in the scrollable area and the list items in the scrollable list that are currently displayed in the scrollable area. The order of list items in the scrollable list displayed in the scrollable area is set initially based on an order of list items provided by the application program 152. The state of the pin holder(s) includes the pins currently pinned to the pin holder(s). The state of the pins may include the order, size and/or location of the pins, and the stored list items corresponding to the pins (the "pinned items"). The state of the stored items corresponding to the pins includes the associated list item data, such as the content, appearance, etc. of the list item that was pinned. The content may comprise a picture, video, audio, text, multimedia object or other suitable logical object, or a combination thereof. When changes are made to the scrollable area or the pin holder, the state information is updated. The stored content corresponding to each pinned list item is stored in a corresponding data structure and assigned and associated with a unique identifier that links the stored content to a corresponding pin displayed on the pinnable VUI screen.

The location and/or size of the pins in the pin holder may be interpreted by an application program 152 to have a logical or semantic meaning based on predefined visual layout rules stored in memory 112. The predefined visual layout rules may be defined by the pinning application 170, an application program 152 which uses the pinning application 170 as an API, or the operating system software 150. The predefined visual layout rules are interpreted by a visual interpreter (not shown) which forms part of the pinning application 170, an application program 152 which uses the pinning application 170 as an API, or the operating system software 150.

When no pinned list items exist (for example, after all pinned list items have been unpinned), changes to the order of list items may be stored permanently by the application program 152, for example, in response to a request to save or store changes following a reordering of list items. When saved, the order of list items in the list stored by the application program 152 is updated to reflect the state of the scrollable area 202 at the time of saving.

Figure 2A:
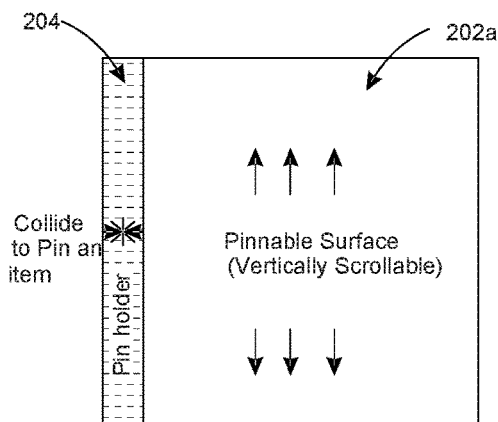
FIGS. 2A-2D illustrate configurations of pinnable VUI screen in accordance with embodiments of the present disclosure.
Figure 2B:
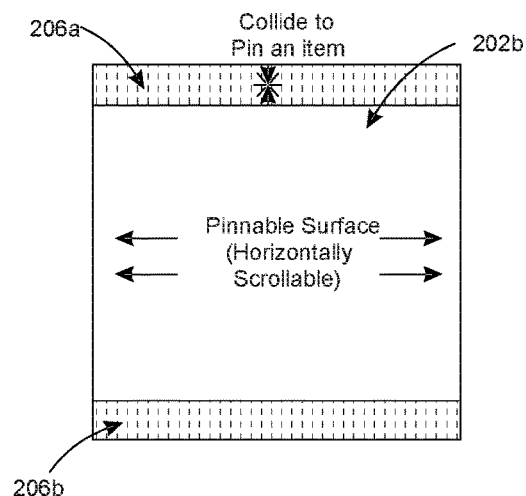
Figure 2C:
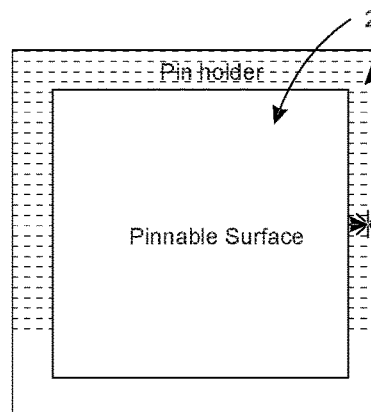
Figure 2D:
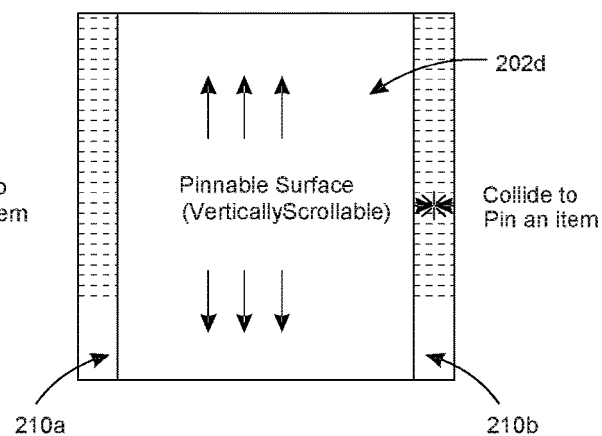

In FIG. 2A, a pin holder 204 is located at the left side of a scrollable area 202a and forms a vertical or vertically extending area. The scrollable area 202a is vertically scrollable but not horizontally scrollable. In FIG. 2B, pin holders 206a and 206b are located at the top and bottom of the scrollable area 202b respectively and form a pair of horizontal or horizontally extending bars. The scrollable area 202b is horizontally scrollable but not vertically scrollable. In FIG. 2C, a pin holder 208 forms a box at the edge of the scrollable area 202c. The scrollable area 202c may be both horizontally and vertically scrollable. In FIG. 2D, pin holders 210a and 210b are located at the left side and right side of the scrollable area 202d respectively, and form vertical or vertically extending areas. The scrollable area 202d is vertically scrollable but not horizontally scrollable.

Figure 3:
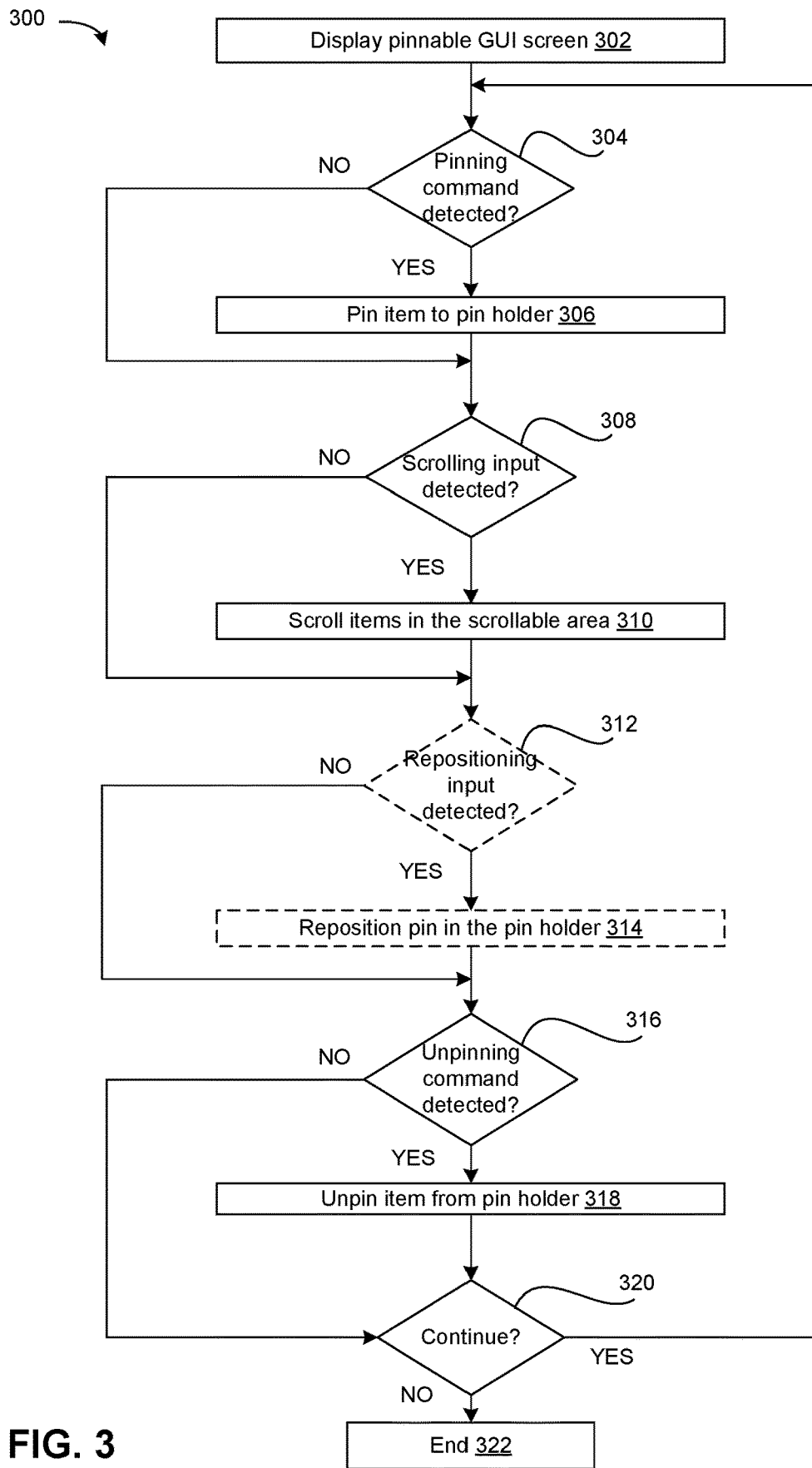
FIG. 3 is a flowchart illustrating a method of managing user interface items in a VUI in accordance with one embodiment of the present disclosure.

FIG. 3 is a flowchart illustrating a method 300 of managing user interface (UI) items in a VUI in accordance with one embodiment of the present disclosure. The method 300 may be carried out by software such as the pinning application 170 executed, for example, by at least the processor 104 of the processing system of the computing device 102 illustrated in FIG. 1.

At operation 302, a pinnable VUI screen is displayed on the touchscreen 138. The pinnable VUI screen comprises a scrollable area having one or more selectable UI items and one or more pin holders, such as a vertically extending area located at the left or right of the pinnable VUI screen or a horizontally extending bar located at the top or bottom of the pinnable VUI screen, as described above.

At operation 304, it is determined whether a pinning command (also known as a pinning event or pinning input) has been detected. A pinning command may be a designated touch interaction with the touchscreen 138 performed by a user in association with a selectable UI item. The touch interaction of the pinning command may comprise one or more touch gestures performed in association with the selectable UI item, sometimes referred to as a pinning gesture. In a preferred example, a pinning command comprises the detection of a swipe gesture in the direction of the pin holder, the swipe gesture having an initial or origin point in the touch area of the selectable UI item and an end point in the touch area of the pin holder. In another example, a pinning command comprises the detection of a long press (also known as a touch-and-hold gesture) in association with the selectable UI item located in the scrollable area for threshold duration of time followed immediately by the swipe gesture. In yet another example, a pinning command comprises a drag gesture in association with a selectable UI item located in the scrollable area from the scrollable area to the pin holder. Other types of pinning commands are possible.

As known to persons skilled in the art, a long press is a touch gesture with a touch point (i.e., centroid) of a touch input that does not move by more than a threshold (tolerance) distance and which has a duration which exceeds a minimum or threshold duration, which may be, for example, 500 milliseconds in some examples. Other threshold durations are possible. A swipe gesture is a directional touch gesture with a single direction. In a swipe gesture, the touch point moves more than the threshold (tolerance) distance for a long press but the gesture ends (i.e., the end point is detected) while the touch point is still moving and has a velocity which exceeds a threshold velocity. The processor 204 receives data from the touchscreen 138 and may evaluate swipes with respect to an origin point at which contact is initially made with the touchscreen 138 and the end point at which contact with the touchscreen 138 ends rather than using each of location or point of contact over the duration of the touch gesture to resolve a direction. Examples of swipes include a horizontal swipe, a vertical swipe, and a diagonal swipe. A horizontal swipe typically comprises an origin point towards the left or right side of the touchscreen 138 to initialize the touch gesture, a horizontal movement of the detected object from the origin point to an end point towards the right or left side of the touchscreen 138 while maintaining continuous contact with the touchscreen 138, and a breaking of contact with the touchscreen 138. Similarly, a vertical swipe typically comprises an origin point towards the top or bottom of the touchscreen 138 to initialize the touch gesture, a vertical movement of the detected object from the origin point to an end point towards the bottom or top of the touchscreen 138 while maintaining continuous contact with the touchscreen 138, and a breaking of contact with the touchscreen 138. Breaking contact of a swipe may be gradual in that contact with the touchscreen 138 is gradually reduced while the swipe is still underway. A drag gesture is different from a swipe gesture in that the touch point (e.g., centroid of the touch event) moves more than the threshold (tolerance) distance but ends when the touch point is no longer moving or is moving at a velocity which does not exceed the threshold velocity.

In response to a determination that a pinning command has been detected, processing proceeds to operation 306 at which the corresponding UI item is pinned to the pin holder. Pinning an UI item to a pin holder comprises removing (also known as undisplaying) the pinned UI item from the scrollable area, displaying an additional UI item from the scrollable list that was not previously displayed, and displaying a pin corresponding to the pinned UI item in the pin holder beside, or proximate to, the location of the pinned UI item before the UI item was removed. In examples in which the scrollable area comprises a scrollable list, each UI item is a list item, and each list item may comprise a row. The pin may be located in a specific location in the area of the pin holder beside the corresponding row, for example, at the top, bottom or center of thereof. Alternatively, the pin may occupy the entire area beside the pin. Alternatively, the pin may be located at a border between the pinned UI item and a previous item in the scrollable list or the border between the pinned UI item and a subsequent item in the scrollable list.

The additional UI item from the scrollable list is typically a subsequent UI item from the scrollable list. The pinning command updates the state information stored by the pinning application 170 in respect of the state of the scrollable area and the state of the pin holder.

The pin is a visual indication of the pinned item. The pin typically has a predefined shape and size. The pin may comprise identifying information identifying the pin as being associated with the pinned item. The pin may comprise a text label (e.g., letter, one or more words, or an index or item order number), a thumbnail image, a preview (e.g., the first word(s) of the text of the pinned UI item and/or thumbnail image) or other identifying information associated with the pinned UI item. The shape of the pin and nature of the identifying information may vary. In the example of FIGS. 4B and 4C, the pin takes the form of a button with an index letter representing the alphabetical order of the list item in the scrollable list at the time of pinning. In the example of FIGS. 5B and 5C, the pin takes the form of a circle with the first letter "G" of the name of the pinned item contained therein as identifying information.

Subsequent to operation 306, or in response to a determination that a pinning command has not been detected (decision block 304), processing proceeds to operation 308 at which it is determined whether scrolling input has been detected. Scrolling may be possible in one or two dimensions depending on the application. In a preferred example, the scrolling input is a swipe in a scrollable direction. A scrollable direction is a direction of the scrollable area in which additional content is located. It will be appreciated that during scrolling additional pinnable UI items may be displayed in the VUI. In one-dimensional scrolling applications, the scrollable direction may be up or down for horizontal scrolling relative to the screen orientation of the VUI or may be left or right for vertical scrolling relative to the screen orientation of the VUI. In two-dimensional scrolling applications, the scrollable direction may be up, down, left or right relative to the screen orientation of the VUI. In another example, the scrolling input is a drag in a scrollable direction. In yet another example, the scrolling input may be a swipe or a drag in a scrollable direction. The scrolling speed may be fixed or dependent on the velocity of the touch point. The scrolling updates the state information stored by the pinning application 170 in respect of the state of the scrollable area.

In response to a determination that scrolling input has been detected, processing proceeds to operation 310 at which the content of the scrollable area is scrolled in a corresponding scrollable direction. Scrolling changes the visual state of the scrollable area (e.g., such as a list view, grid view or gallery view). Scrolling comprises updating the content of the scrollable area in accordance with the distance or velocity of the scrolling input, depending on the gesture used for scrolling input. The amount of scrolling relative to the distance of the scrolling input is typically a ratio of 1:1 on a pixel-to-pixel basis when a drag gesture is used as the scrolling input, however, a different ratio may be used. The scrolling speed is typically dependent on the velocity of the touch point when a swipe gesture is used as the scrolling input.

Subsequent to operation 310, or in response to a determination that scrolling input has not been detected (decision block 308), processing proceeds to operation 312 when one or more UI items, such as list items, have been pinned to the pin holder. At operation 312, it is determined whether repositioning input performed by a user in association with a pin in the pin holder has been detected. In some examples, repositioning input comprises a drag gesture performed on, or in association with, a pin located in the pin holder and in a scrollable direction.

In response to a determination that repositioning input has been detected, processing proceeds to operation 314 at which the pin is repositioned in the pin holder in accordance with the repositioning input. Visualization may be provided to assist the user in repositioning. The visualization may comprise the display of directional arrows, guidelines, gridlines, or the like to provide visual guidance and affordance as to the directions or positions in which the pin may be moved and the gesture required to perform such movements. The visualization may also provide visualization in the form of a directional arrow, guideline, gridline, or the like to provide visual guidance and affordance as to an unpinning gesture required to unpin the corresponding pinned item. The pin is repositioned (moved) in a direction corresponding to the direction of the repositioning input and by a distance corresponding to the distance of the corresponding repositioning input. The distance that the pin is repositioned relative to the distance of the repositioning input is typically a ratio of 1:1 on a pixel-to-pixel basis, however, a different ratio may be used. The repositioning updates the state information stored by the pinning application 170 in respect of the state of the pin holder.

It will be appreciated that operations 312-314 are optional and are only performed when one or more UI items, such as list items, have been pinned to the pin holder. The performance of operations 312-314 may be omitted when no pinned UI items exist.

Subsequent to operation 314, or in response to a determination that repositioning input has not been detected (decision block 312), processing proceeds to operation 316 when one or more UI items, such as list items, have been pinned to the pin holder. At operation 316, it is determined whether an unpinning command (also known as an unpinning event or unpinning input) has been detected. An unpinning command may be a designated touch interaction with the touchscreen 138 performed by a user in association with a pin. The touch interaction of the unpinning command may comprise one or more touch gestures performed in association with a pin, sometimes referred to as an unpinning gesture. In a preferred example, a pinning command comprises the detection of a swipe gesture in the direction of the scrollable area and away from the pin holder, the swipe gesture having an initial or origin point in the touch area of the pinned UI item in the pin holder and an end point in the touch area of the scrollable area. In another example, an unpinning command comprises the detection of a long press in association with a pin for a threshold duration of time followed immediately by the swipe gesture. In yet another example, an unpinning command comprises a drag gesture in association with a pin located in the pin holder from the pin holder to the scrollable area. Other types of unpinning commands are possible.

In response to a determination that an unpinning command has been detected, processing proceeds to operation 318 at which the corresponding pinned item is unpinned from the pin holder. Unpinning a pinned item from the pin holder comprises adding (or inserting) the pinned UI item to the scrollable area at a position corresponding to the position of the pin when the pinned UI item is unpinned from the pin holder, removing the corresponding pin from the pin holder, and removing one of the currently displayed UI items in the scrollable area to accommodate the added/inserted UI item. In some examples, the pinned UI item is added to the scrollable area before the UI item which is located beside, or proximate to, the position of the pin. In other examples, the pinned UI item is added to the scrollable area after the UI item which is located beside, or proximate to, the position of the pin. The location of where the pinned UI item is added may be an application setting. The unpinning command updates the state information stored by the pinning application 170 in respect of the state of the scrollable area and the state of the pin holder.

It will be appreciated that operations 316-318 are optional and are only performed when one or more UI items, such as list items, have been pinned to the pin holder. The performance of operations 316-318 may be omitted when no pinned UI items exist.

Subsequent to operation 318, or in response to a determination that an unpinning command has not been detected (decision block 316), processing proceeds to operation 320 at which it is determined whether to continue the method 300. Alternatively, the operation 320 may be omitted or performed in the background by the operating system 150. In response to a determination that an input or event designated to end the method 300 has been detected, processing proceeds to operation 322 at which the method 300 ends. In response to a determination that an input or event designated to end the method 300 has not been detected, processing proceeds to operation 302. Examples of an input or event designated to end the method 300 is the closing of the pinning application 170, switching the active or foreground application to an application that does not support pinning, or disabling the pinning feature via changing a setting, menu option or the like.

If the method 300 ends while one or more UI items, such as list items, are pinned to the pin holder, the state information maintained by the pinning application 170 such as the changes to the order of the list items in the scrollable list is discarded. If the method 300 ends while no UI items are pinned to the pin holder, the changes to the order of the list items in the scrollable list may be automatically saved to memory if not already stored or discarded, depending on the application setting. As noted above, when no pinned UI items exist, changes to the order of UI items, such as list items, may be stored permanently by the application program 152, for example, in response to a request to save or store changes.

One-Dimensional Embodiments

Referring now to FIGS. 4A-4I, a sequence of pinnable visual user interface (VUI) screens in accordance with a first example of a user interaction utilizing the method of FIG. 3 will be described. In the first example, the scrollable area of the pinnable VUI screens comprises a scrollable list 400 displayed on the touchscreen 138. The scrollable list 400 comprises a plurality of list items. Each list item in the scrollable list 400 is presented as a row, with each row in the scrollable list 400 having the same height and width. A pin holder 402 is located at the left side of the scrollable list 400. The pin holder 402 is shown in dotted lines and shading in FIG. 4A for the purpose of explanation but is invisible during use. The scrollable list 400 includes a number of list items denoted A to Z. In FIG. 4A, the list items are arranged in alphabetical order from A to Z with only list items A to F being shown and list items G-Z being displayable in response to scrolling input. The scrollable list 400 may include greater or fewer list items in other examples and may be ordered by means other than alphabetical order in other examples, including but not limited to numeric order. In the shown example, the scrollable list 400 is scrollable in the vertical direction only.

Referring to FIG. 4A, in response to detection of a pinning command in the form of a right-to-left swipe (also known as a left swipe) performed by a user with respect to list item E, the list item E is pinned to the pin holder 402. As shown in FIG. 4B, the detection of the pinning command causes the display of a pin 404 corresponding to the list item E in the pin holder 402 beside, or proximate to, the location of the list item E in the scrollable list 400 when it was pinned, the removal of the pinned list item (list item E) from the scrollable list 400, and the display of an additional list item (list item G) at the bottom of the VUI screen so that list items A-D, F-G are shown in FIG. 4B. In the shown example, the pin 404 is smaller than the height of the rows representing the list items. In other examples, the pin 404 may be the same height as list items in other examples.

In the shown example, only one pin may be positioned beside, or proximate to, each row/list item in the scrollable list 400. This effectively limits the number of pins/list items at a given time to the number of rows/list items in the scrollable list 400 that are displayable. In other examples, more than one pin may be positioned beside, or proximate to, each row/list item in the scrollable list 400.

Referring to FIG. 4B, in response to detection of the pinning command performed in the form of a left swipe by a user with respect to list item D, the list item D is pinned to the pin holder 402. As shown in FIG. 4C, the detection of the pinning command causes the display of a pin 406 corresponding to the pinned list item D in the pin holder 402 beside, or proximate to, the location of the pinned list item D in the scrollable list 400, the removal of the pinned list item D from the scrollable list 400, and the display of an additional list item (list item H) at the bottom of the VUI screen so that list items A-C, F-H are shown in FIG. 4C.

Referring to FIGS. 4D and 4E, in response to detection of scrolling input performed by a user in the scrollable area (i.e., the scrollable list 400) (FIG. 4D), the content of the scrollable area is scrolled, resulting in the display of list items P-U (FIG. 4E). The pins 404 and 406 remain pinned to the pin holder 402 in the same location during and after the scrolling.

Referring to FIGS. 4F and 4G, in response to detection of repositioning input performed by a user in association with a pin in the pin holder 402, the pin 406 corresponding to the list item D is moved from a first position in the scrollable list 400 (FIG. 4F) to a second position in the scrollable list 400 (FIG. 4F). As noted above, a repositioning input may comprise a drag gesture in association with a pin located in the pin holder 402 in a scrollable direction. In some examples in which only one pin may be positioned beside, or proximate to, each row/list item in the scrollable list 400, there is a fixed position beside, or proximate to, each row/list item in the scrollable list 400, that a pin may be located. For example, in the first example, because the rows for each list item have a fixed height, there may be an index position for each row/list item in the scrollable list 400, with repositioning input moving pins from the index position from one row to another row in the scrollable list 400. The index position may be the center of the area of the pin holder beside or opposite the row in the scrollable list 400. In some examples, to move a pin to the index position of a row/list item in the scrollable list 400, the centroid of the touch input need only move to the touch area corresponding to the respective row in the scrollable list 400.

Referring to FIGS. 4G and 4H, in response to detection of an unpinning command in the form of a left-to-right swipe (also known as a right swipe) performed by a user with respect to pin 406, the list item D is unpinned from the pin holder 402 and added to, or inserted in, the scrollable list 400 at a position in the scrollable list 400 corresponding to the position of the pin 406 when the list item D is unpinned from the pin holder 402. In the shown example, during unpinning the list item D is added to the scrollable list 400 before the list item which is located beside, or proximate to, the position of the pin 406.

In FIG. 4G, the displayed portion of the scrollable list 400 shows the list items P, Q, R, S, T and U. Because the pin 406 corresponding to list item D is unpinned while list item D is beside, or proximate to, the list item Q (FIG. 4G), the list item D is added to the scrollable list 400 at a position before the list item Q. The pin 406 is removed from the pin holder 402 and list item U is removed from the currently displayed list items in the scrollable list 400. As a result, following the unpinning command, the list item D is positioned between list items P and Q in the displayed portion of the scrollable list 400, which displays the list items P, D, Q, R, S and T (FIG. 4H).

Referring to FIGS. 4H and 4I, in response to detection of an unpinning command in the form of a right swipe performed by a user with respect to pin 404, the list item E is unpinned from the pin holder 402 and added to, or inserted to, the scrollable list 400 at a position in the scrollable list 400 corresponding to the position of the pin 404 when the list item E is unpinned from the pin holder 402. In the shown example, during unpinning the list item E is added to the scrollable list 400 before the list item which is located beside, or proximate to, the position of the pin 404.

In FIG. 4H, the displayed portion of the scrollable list 400 shows the list items P, D, Q, R, S and T. Because the pin 404 corresponding to list item E is unpinned while list item E is beside, or proximate to the list item S (FIG. 4H), the list item E is added to the scrollable list 400 at a position before the list item S. The pin 404 is removed from the pin holder 402 and list item T is removed from the currently displayed items in the scrollable list 400. As a result, following the unpinning command, the list item E is positioned between list items R and S in the displayed portion of the scrollable list 400, which displays the list items P, D, Q, R, E and S (FIG. 4I).

Referring now to FIGS. 5A-5D, a sequence of pinnable VUI screens in accordance with a second example of a user interaction utilizing the method of FIG. 3 will be described. In the second example, the scrollable area of the pinnable VUI screens comprises a scrollable list 500 displayed on the touchscreen 138. The scrollable list 500 comprises a plurality of list items. The scrollable list 500 is similar to the scrollable list 400. Each list item in the scrollable list 500 is presented as a row, with each row in the scrollable list 500 having the same height and width. A pin holder 502 is located at the left side of the scrollable list 500. The pin holder 502 is shown in dotted lines and shading in FIG. 5A for the purpose of explanation but is invisible during use. In the shown example, the scrollable list 500 is scrollable in the vertical direction only.

Figure 5A:
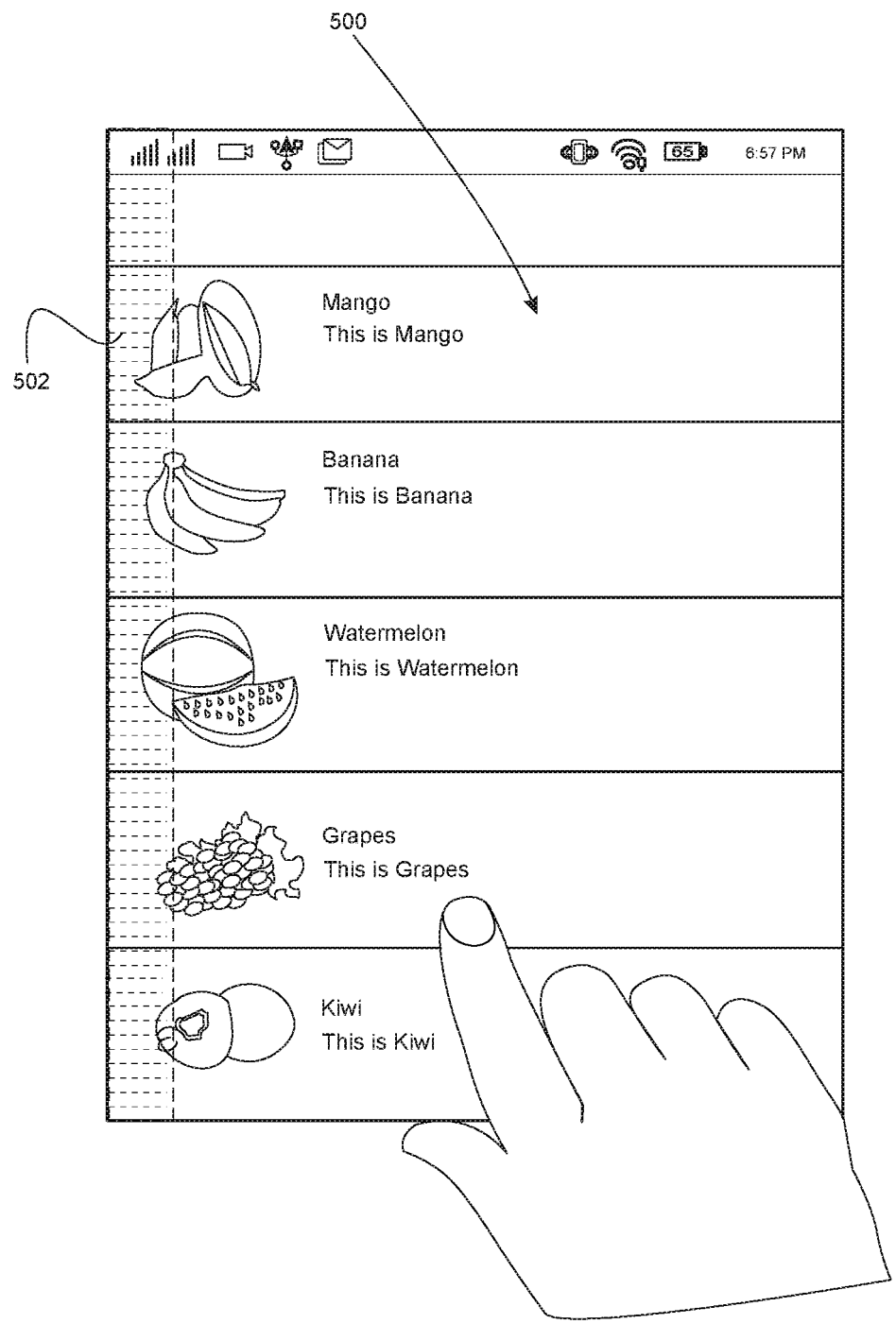
FIGS. 5A-5D illustrate a sequence of pinnable VUI screens in accordance with a second example of a user interaction utilizing the method of FIG. 3.
Figure 5B:
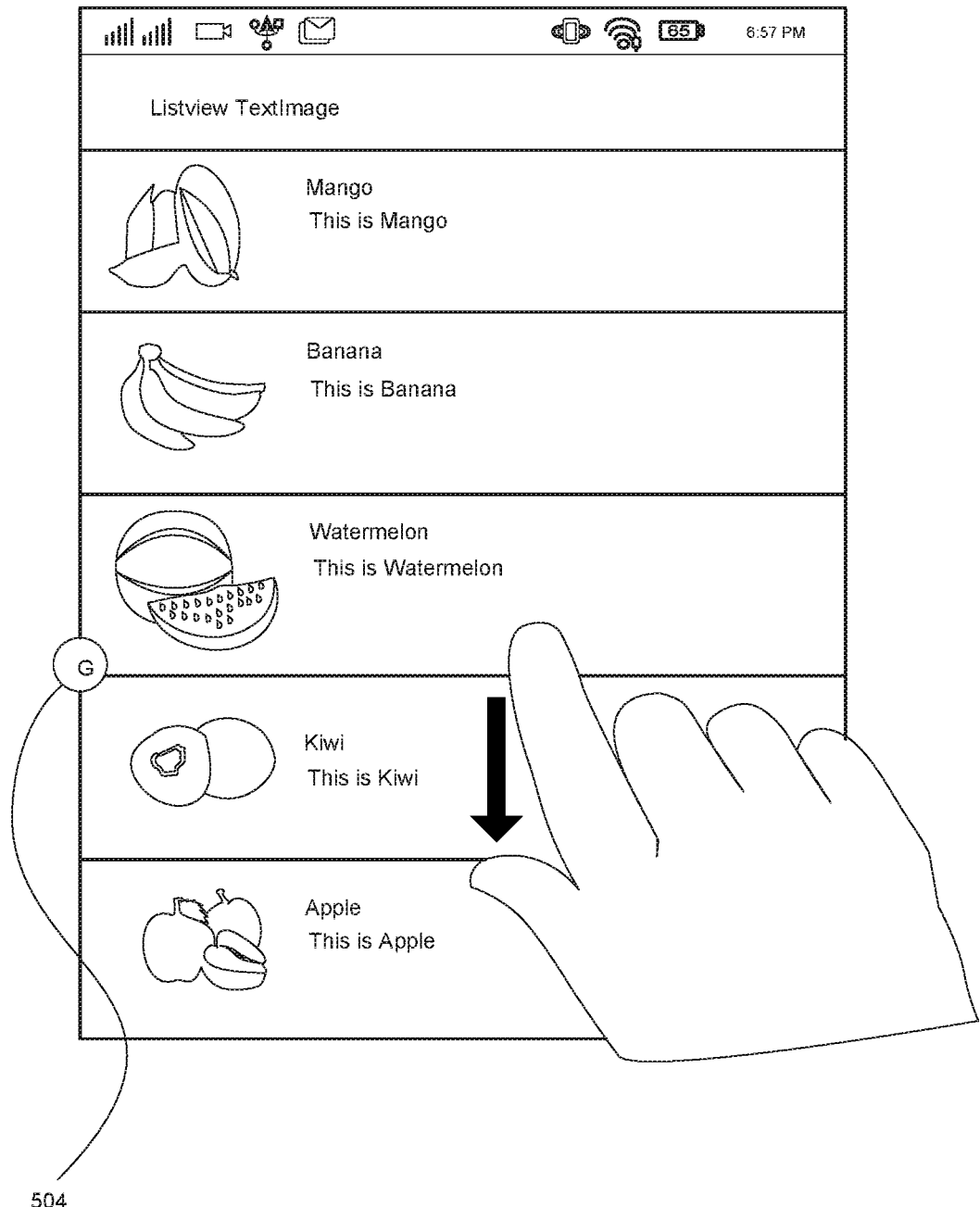
Figure 5C:
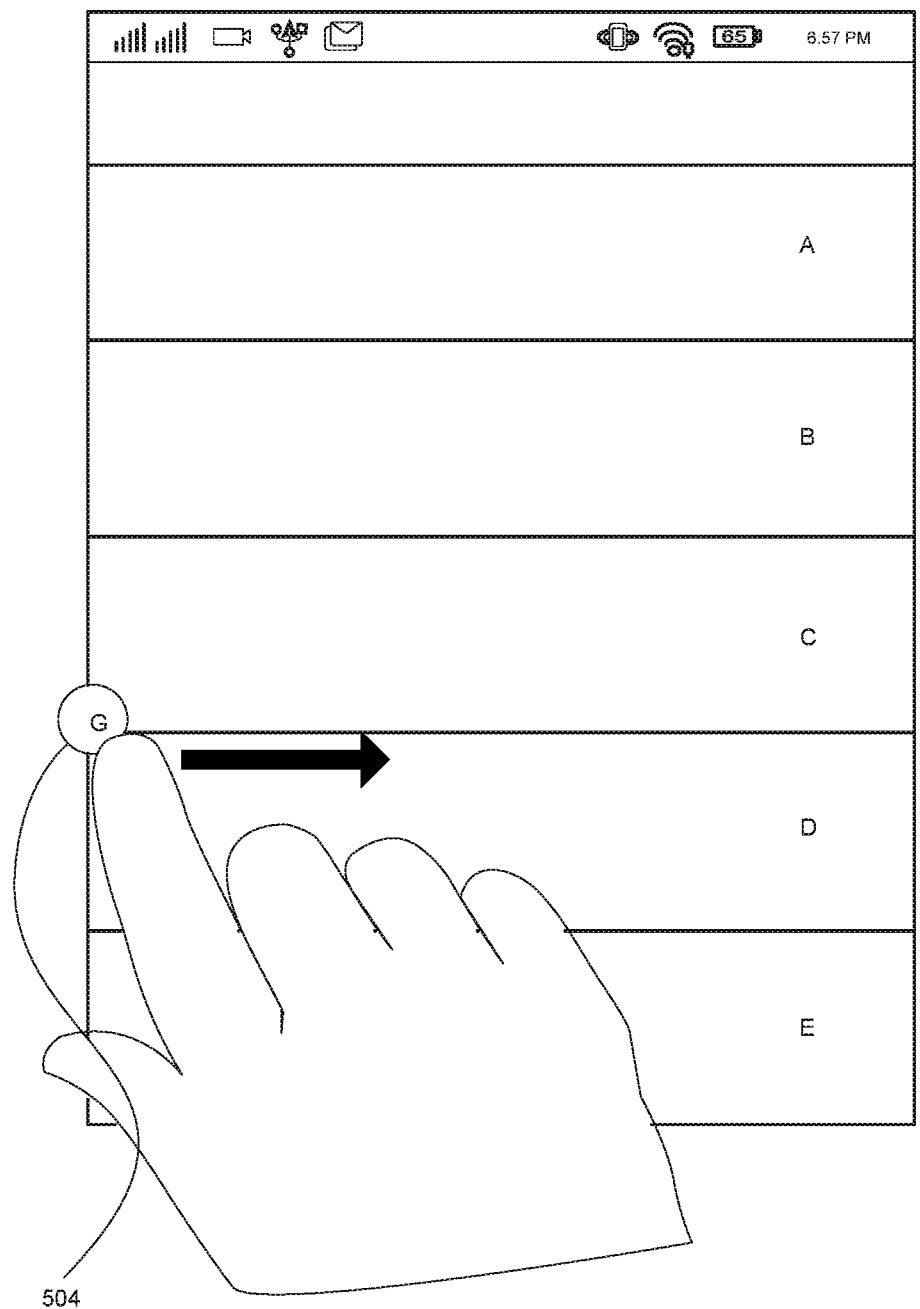

Referring to FIGS. 5A and 5B, in response to detection of a pinning command in the form of a left swipe performed by a user with respect to list item "Grapes", the list item "Grapes" is pinned to the pin holder 502. As shown in FIG. 5B, the detection of the pinning command causes the display of a pin 504 corresponding to the pinned list item "Grapes" in the pin holder 502 beside, or proximate to, the location of the scrollable list 500, the removal of the pinned item "Grapes" from the scrollable list 500, and the display of an additional list item (list item "Apples") at the bottom of the VUI screen. In the shown example, the pin 504 is located at a border between the pinned list item "Grapes" and the previous item in the scrollable list 500, the list item "Watermelon". The pin 504 takes the form of a circle with the first letter "G" of the name of the pinned list item contained therein as identifying information.

Referring to FIGS. 5B and 5C, in response to detection of scrolling input performed by a user in the scrollable list 500, the content of the scrollable area is scrolled, resulting in the display of a pinnable VUI screen comprising list items A-E (FIG. 5C). The pin 504 remains pinned to the pin holder 502 in the same location during and after the scrolling.

Figure 5D:
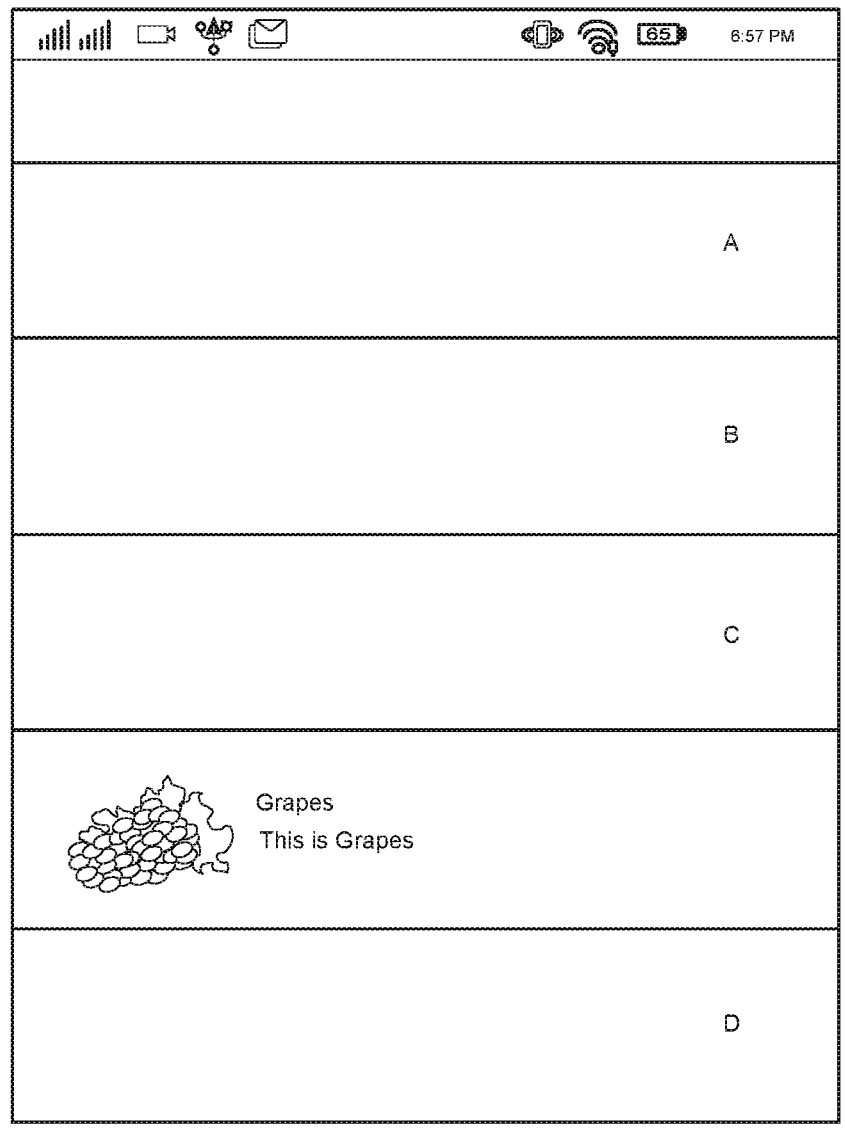

Referring to FIGS. 5C and 5D, in response to detection of an unpinning command in the form of a right swipe performed by a user with respect to pin 504, the list item "Grapes" is unpinned from the pin holder 502. The unpinning comprises displaying a pinnable VUI screen in which the list item "Grapes" is added or inserted into the scrollable list 500 at a position in the scrollable list 500 corresponding to the position of the pin 504, and the pin 504 is removed. In the shown example, during unpinning the list item "Grapes" is added to the scrollable list 400 between the list items C and D.

The one-dimensional pinning method described above has several advantages including that it reduces the temporal demands, efforts and the time required to reposition multiple items that exists with present reordering techniques, and improves the accuracy of repositioning items when compared with present reordering techniques.

Two-Dimensional Embodiment

Referring now to FIGS. 6A-6E, a sequence of pinnable visual user interface screens in accordance with a third example of a user interaction utilizing the method of FIG. 3 will be described. In the third example, the scrollable area of the pinnable VUI screens comprises a two-dimensional scrollable array (or grid) 600 displayed on the touchscreen 138 such as a table or gallery. The scrollable array 600 comprises a plurality of UI items arranged in rows and columns, sometimes referred to as cells. The cells are arranged in sequence. In the shown example, each cell has the same height and width. Pin holders 602 and 604 are located at the left side and right side of the pinnable VUI screens. The pin holders 602 and 604 are shown in dotted lines and shading in the pinnable VUI screen shown in FIG. 6A for the purpose of explanation but are invisible during use. In the shown example, the scrollable array 600 is scrollable in the vertical direction only.

Figures 6A, 6B:
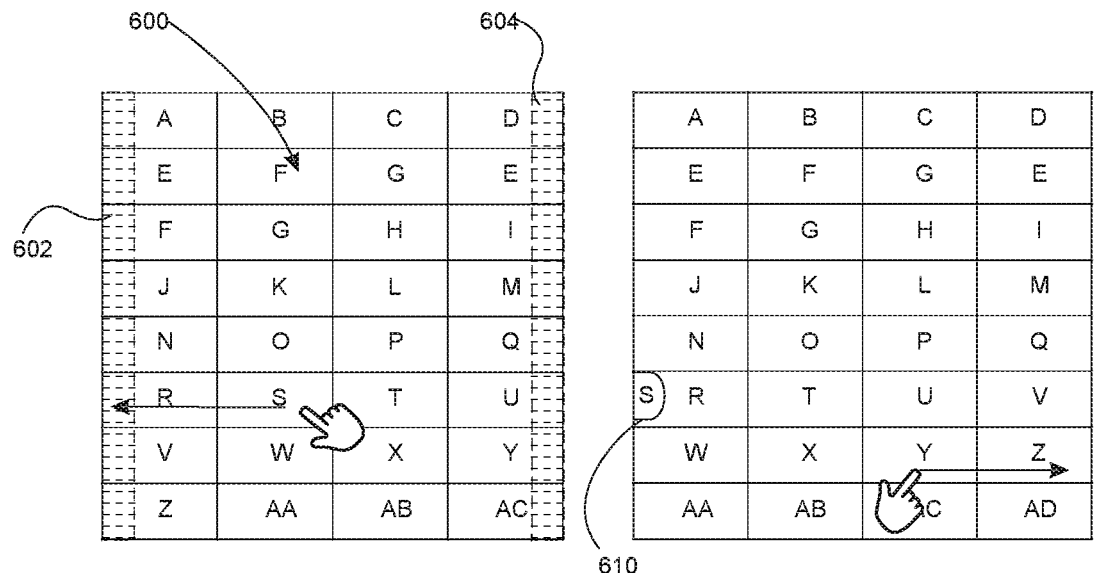
FIGS. 6A-6E illustrate a sequence of pinnable VUI screens in accordance with a third example of a user interaction utilizing the method of FIG. 3.

Referring to FIGS. 6A and 6B, in response to detection of a pinning command in the form of a left swipe performed by a user with respect to cell "S", the cell "S" is pinned to the pin holder 602. The detection of the pinning command causes a pin 610 corresponding to the pinned UI item (i.e. cell "S") in the pin holder 602 to be displayed proximate to the location of the pinned UI item (cell "S" in the scrollable array 600 shown in the pinnable VUI screen of FIG. 6A), the pinned item (cell "S") from the scrollable array 600 shown in the pinnable VUI screen of FIG. 6A to be removed, and an additional UI item (cell "AD") to be added at the bottom of the scrollable array 660 shown in the pinnable VUI screen shown in FIG. 6B. The removal of the pinned UI item (cell "S") causes the remaining UI items (cells), i.e. cells "T", "U", "V", "W", "X", "Y", "Z", "AA", "AB" and "AC", to shift appropriately based on the removed pinned UI item (cell "S"). In the pinnable VUI screen shown in FIG. 6B, the pin 610 takes the form of a button with an index letter representing the alphabetical letter of the pinned UI item (cell "S") in the scrollable array 600 at the time of pinning, namely "S".

Figures 6C, 6D:
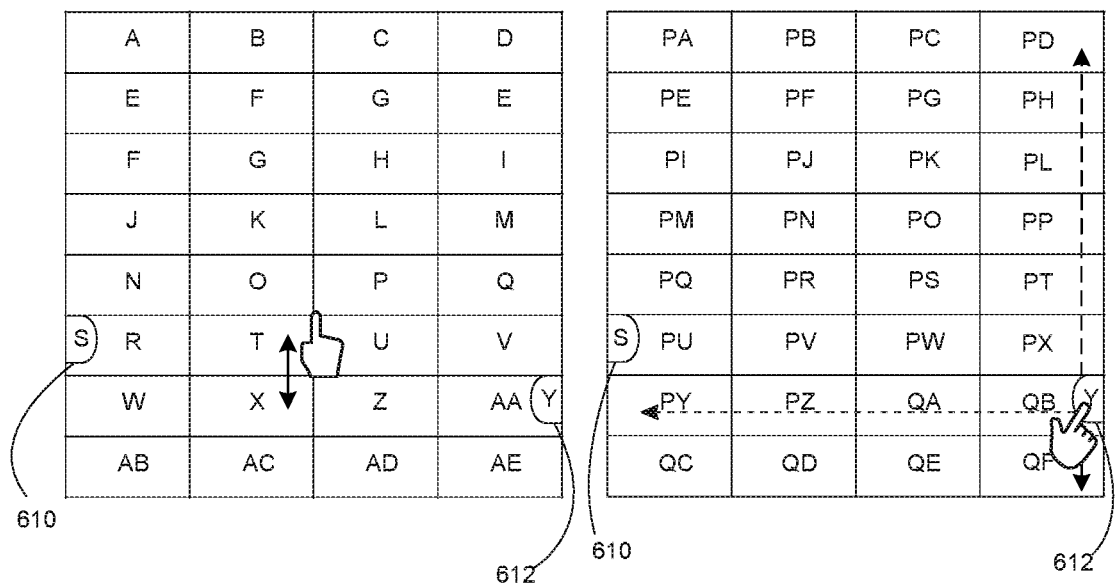

Referring to FIGS. 6B and 6C, in response to detection of a pinning command in the form of a right swipe performed by a user with respect to cell "Y", the cell "Y" is pinned to the pin holder 604. The detection of the pinning command causes a pin 612 corresponding to the pinned UI item (cell "Y") to be displayed in the pin holder 604 proximate to the location of the pinned UI item, the pinned UI item (cell "Y") to be removed from the scrollable array 600 and the display of an additional item (cell "AE") at the bottom of the pinnable VUI screen shown in FIG. 6C. The removal of the pinned UI item (cell "Y") causes the remaining pinned UI items (cells), i.e. cells "T", "U", "V", "W", "X", "Z", "AA", "AB", "AC" and "AD", in the scrollable array 600 to shift appropriately based on the removed pinned UI item (cell "Y"). In the pinnable VUI screen shown in FIG. 6C, the pin 612 takes the form of a button with an index letter representing the alphabetical letter of the pinned UI item (cell "Y") in the scrollable array 600 at the time of pinning, namely "Y".

Referring to FIGS. 6C and 6D, in response to detection of scrolling input performed by a user in the scrollable array 600, the content of the scrollable area is scrolled, resulting in the change of the visible state of the scrollable array 600 by display of a new set of UI items (cells) (FIG. 6D). The pins 610 and 612 remain pinned to the pin holders 602, 604 respectively in the same location during and after the scrolling.

Figure 6E:

Referring to FIGS. 6D and 6E, in response to detection of an unpinning command in the form of a drag gesture performed by a user with respect to pin 612 from the pin holder 604 to the desired position (the current position of the cell "PY" in the shown example), the pinned UI item (cell "Y") is unpinned from the pin holder 604. The unpinning comprises adding, or inserting, the pinned UI item (cell "Y") into the scrollable array 600 at a position in the scrollable array 600 corresponding to the position of the UI item (cell "PY), and removing the pin 612. The addition or insertion of the pinned UI item (cell "Y") causes the existing UI items (cells) in the scrollable array 600, i.e. cells "PY", "PZ", "QA", "QB", "QC", "QD", "QE", and "QF", to shift appropriately based on the added or inserted pinned UI item (cell "Y") as shown in the pinnable VUI screen in FIG. 6E.

Third Embodiment—Preserving UI Item Position or State

Figure 7:
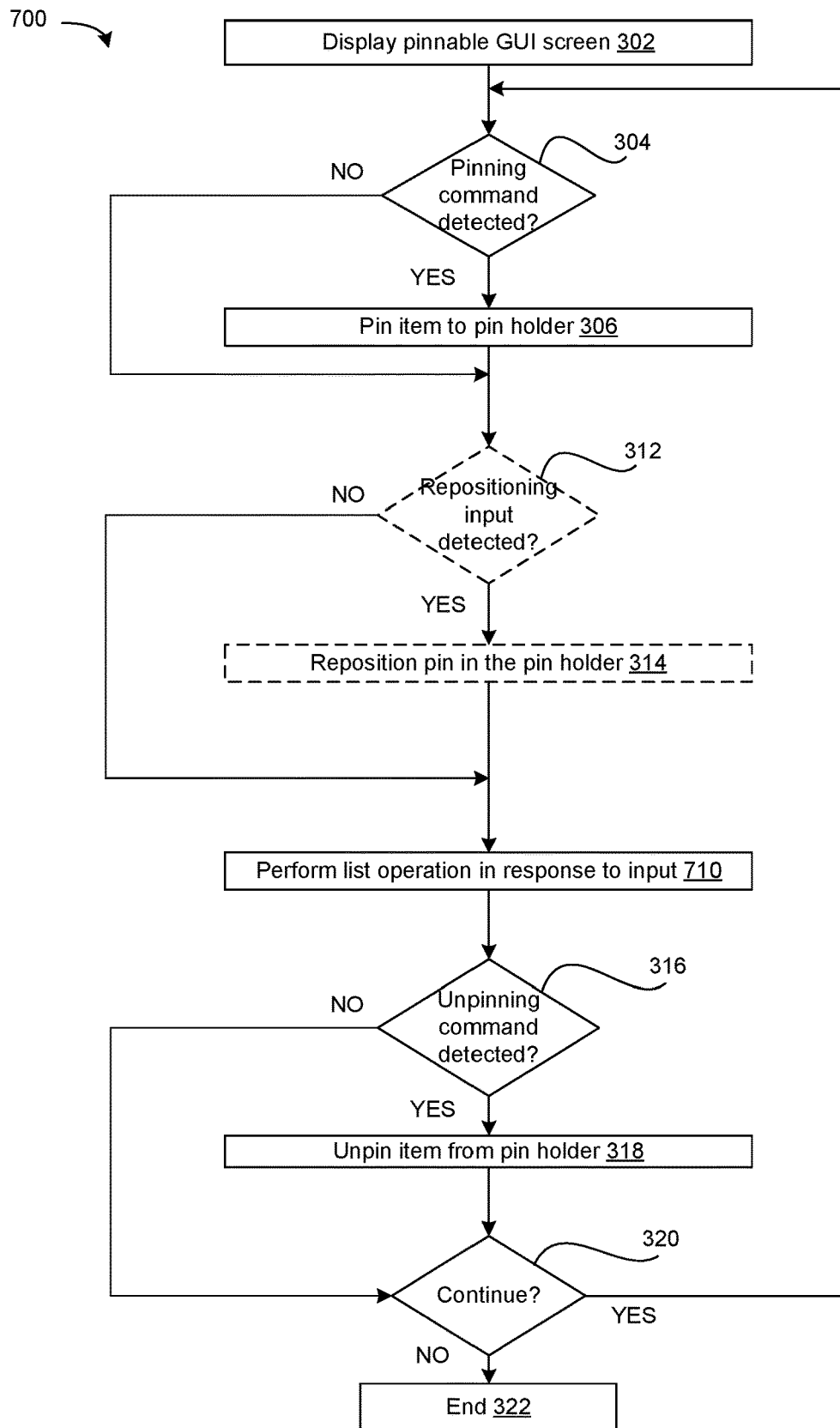
FIG. 7 is a flowchart illustrating a method of managing user interface items in a VUI in accordance with another embodiment of the present disclosure.

FIG. 7 is a flowchart illustrating a method 700 of managing user interface items in a VUI in accordance with one embodiment of the present disclosure. The method 700 may be carried out by software such as the pinning application 170 executed, for example, by at least the processor 104 of the processing system of the computing device 102 illustrated in FIG. 1. The method 700 is similar to the method 300. However, rather than changing the position of a few pinned UI items, such as list items, the position of all or a group of UI items is changed while the position of one or more UI items is preserved by pinning them.

Operations 302-306 are performed as described above. At operation 312, it is determined whether repositioning input performed by a user in the association with a pin in the pin holder has been detected. In response to a determination that repositioning input has been detected, processing proceeds to operation 314 at which the pin is repositioned in the pin holder in accordance with the repositioning input. Repositioning in the method 700 allows the order of pins (and pinned) UI items to be changed with respect to each other but not the unpinned UI items.

It will be appreciated that operations 312-314 are optional and are only performed when one or more UI items have been pinned to the pin holder. The performance of operations 312-314 may be omitted when no pinned UI items exist.

Subsequent to operation 314, or in response to a determination that repositioning input has not been detected (decision block 312), processing proceeds to operation 710.

At operation 710, a list operation is performed on a list displayed in the scrollable area in response to detection of corresponding input. The input may be generated by the selection of a corresponding menu option via invoking a corresponding menu, a touch gesture, or other suitable means. The list is a list view displayed in the scrollable area. Alternatively, the list may be a row or column in a grid view, such as a spreadsheet. The list operation may be a sort operation, which sorts the unpinned items by a parameter associated with the list items. The sort operation may be a sort by value (e.g., numerical or alphabetical order) of a data value of the list items, by date of a date value associated with the list items, or other suitable data parameter. Examples of data values may be cost or time. Examples of the date value include a date added, date edited and date modified, among other possibilities. The order of the unpinned list items in the list is changed by the list operation.

Operations 316-322 are then performed as described above.

The pinnable VUI screens occupy the entire display area of the touchscreen 138 in the shown examples.

Although some of the above-described embodiments have been described in connection with lists and tables, the teachings of the present disclosure are not limited to lists or tables and extend to other pinnable VUI screens with ordered UI items such as a gallery or other similar array.

Fourth Embodiment—Pinnable Clipboard

The fourth embodiment is a pinnable clipboard that allows UI items to be pinned and unpinned within and between applications programs 152. The clipboard is a buffer provided by the operating system software 150 that provides short-term storage and transfer within and between applications programs 152. The clipboard is typically temporary with its contents residing in RAM 108. The operating system software 150 provides an API by which application programs 152 may add and remove items via corresponding cut, copy and paste operations or the like. The pinning application 170 defines the methods for the user to command these operations via pinning and unpinning commands as described herein.

The pinnable clipboard may be applied to most or all pinnable VUI screens with dynamic content. The edges of the pinnable VUI screen acts as the pin holder and inner part of the pinnable VUI screen act as the pinnable surface. Any of the pinnable VUI screen configurations of FIGS. 2A-2D may be used as the pin holder, although the pinnable VUI screen configurations shown in FIGS. 2C and 2D are preferable.

The pinnable clipboard may be used in a reading and/or composition application or scenario. While a user is reading content in the dynamic content area such as a web page in a Web browser application, content such as images or text strings (e.g., paragraphs) may be pinned (e.g., to the edge of the pinnable VUI screen). The user may then switch to another application program 152 and unpin the pinned content within the other application program 152.

Figure 8A:
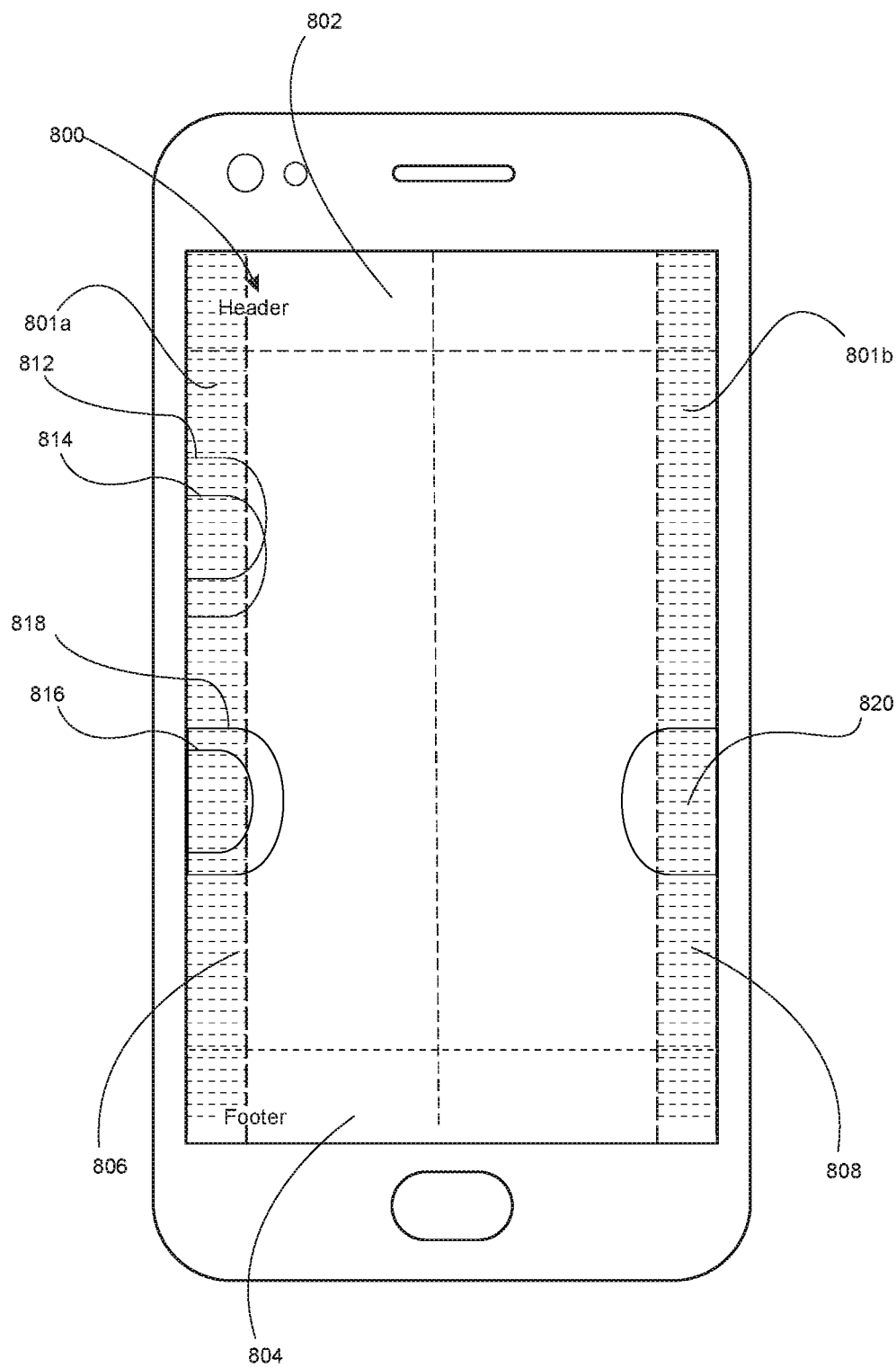
FIGS. 8A and 8B illustrate a computing device with a pinnable VUI screen in accordance with embodiments of the present disclosure.
Figure 8B:
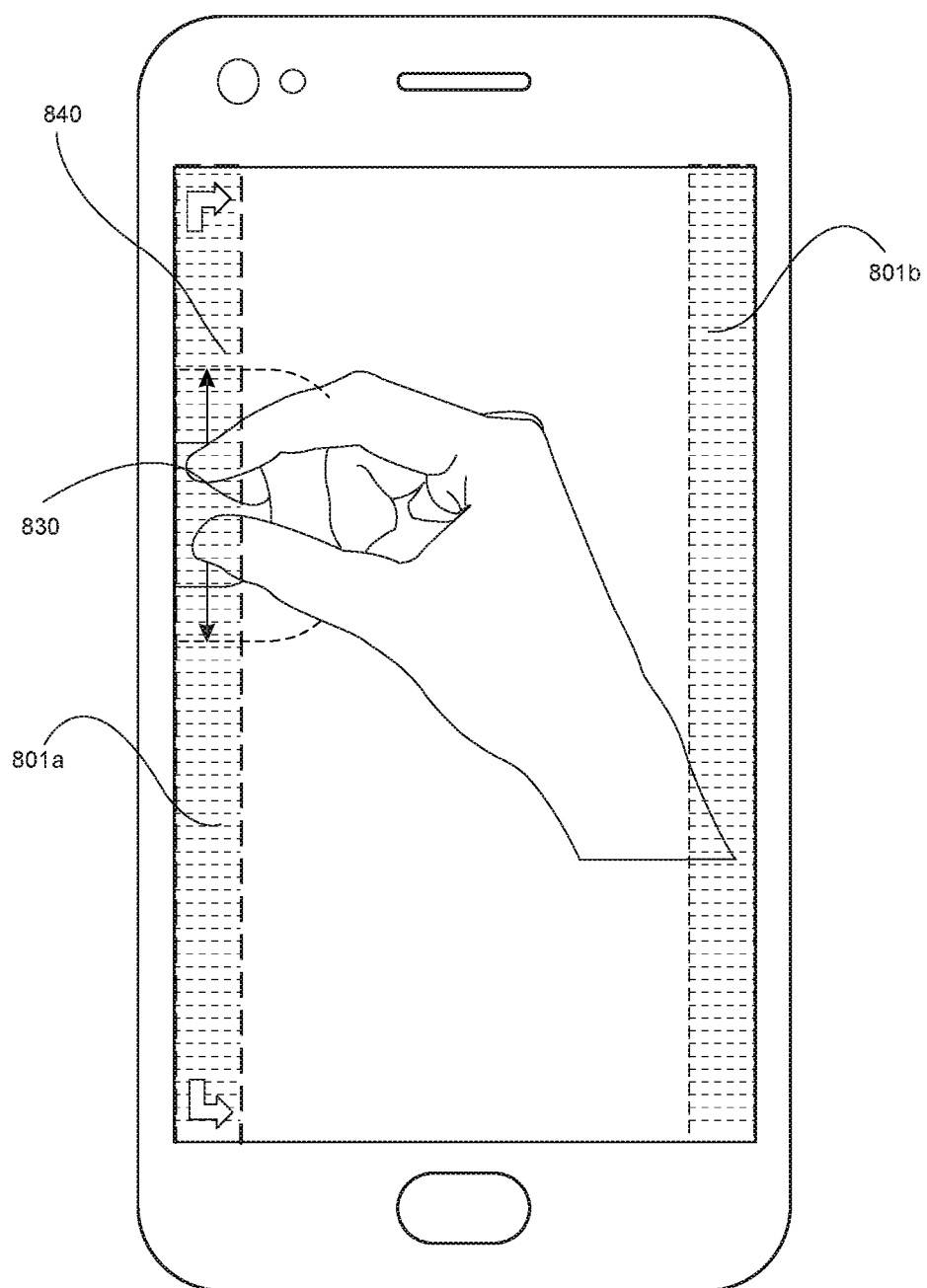

Reference will now be made with respect to FIGS. 8A and 8B which illustrate a computing device with a pinnable VUI screen in accordance with embodiments of the present disclosure. In FIGS. 8A and 8B, a first pin holder 801a is located at a left side of a display area of the touchscreen 138 and a second pin holder 801b is located at a right side of the display area of the touchscreen 138. The pin holders 801a and 801b are also located at the left and right edges of the VUI screen, respectively. The first pin holder 801a and second pin holder 801b persist across pinnable VUI screens of a different applications.

The pin holders 801a and 801b are shown in dotted lines and shading for the purpose of explanation but are invisible during use. As best shown in FIG. 8A, the pinnable VUI screen 800 comprises a plurality of sections including a header 802, footer 804, left side 806 and right side 808. The boundaries of the sections are indicated via dotted lines for the purpose of examples. The sections are logical division of the pinnable VUI screen 800 which may be used by the application program 152, for example, for interpreting pin locations during document composition or the like, as described in more detail below. In use, there may be no visual indication of the sections displayed on the touchscreen 128.

In FIG. 8A, a plurality of pins denoted by references 812, 814, 816, 818, and 820 are attached to the pin holders. Pins 816 and 820 are located parallel to each other on the left and right side of the pinnable VUI screen 800. Pin 816 is located within pin 818. Pins 812 and 814 are overlapping. As described below, pin locations, including relative locations with respect to other pins, and/or size may be interpreted by application program 152 to have a logical or semantic meaning.

Objects may be pinned to one of the pin holders via a pinning command. A pinning command is a designated touch interaction with the touchscreen 138 performed by a user in association with selected content. The touch interaction of the pinning command comprises one or more touch gestures performed in association with the selected content. The selectable content may comprise a picture, video, audio, text or multimedia object, or other suitable logical object. The operating system software 150 or application program 152 includes logical data object mappings that link each logical data object to one or more physical data objects stored in memory and may include transformation logic. The content may be selected by selecting an onscreen object or region of interest (ROI) via a touch input such as a long press. A selection marker may be displayed to provide a visualization of the selected content. The selection marker may be adjusted, either moved or changed in size (e.g., increased or decreased) in accordance with corresponding touch interaction, for example, by dragging the selection marker or ends thereof. In a preferred example, a pinning command comprises the selection of content followed immediately by a drag gesture in which the selected content is moved to the pin holder. The drag gesture has an initial or origin point in the touch area of the content area and an end point in the touch area of the pin holder. The collision of the touch point with the border of the pin holder may trigger the pinning command. Alternatively, a swipe gesture may be used instead of a drag gesture.

As described above, a pin corresponding to the pinned objects is added to the pin holder in response to detection of the pinning command. In some examples, the pin may be located on the pin holder at a location corresponding to the pinning command (e.g., at the location of an endpoint of a pinning gesture). In other examples, the pins may be arranged in the sequence of their occurrence. The pins may be move in response to corresponding input such as a touch gesture, for example, by a drag gesture dragging the pin along the pin holder located at the edge of the pinnable VUI screen. In some examples, dragging or otherwise moving a pin to the top or bottom of the pinnable VUI screen caused the pin to move to the pin holder on the opposite side of the pinnable VUI screen (i.e., from the left side to the right side and vice versa).

The size of the pin may be changed via corresponding input such as a touch gesture in some examples. For example, a pinch gesture to increase or decrease the size of the pin on the touchscreen 138. FIG. 8B illustrates a pin in a first state (or size), indicated by the reference 830, and a second state (or size), indicated by the reference 840. The first state 830 may represent at least one of an initial size of the pin and a minimum size of the pin. The second state 840 may represent a maximum size of the pin. The size of the pin may be changed by a corresponding touch gesture such as a pinch gesture, performed with two fingers. A pinch open gesture may be used to increase the size of the pinch whereas a pinch close gesture (also known as a reverse pinch) may be used to decrease the size of the pin. As noted above, the size of the pin may be interpreted by application program 152 to have a logical or semantic meaning.

Interaction with the pinned objects associated with the pins while attached to the pin holder may be possible, for example via corresponding input such as a touch gesture. In some examples, a detection of a long press on or in association with a pin causes a context-sensitive menu to be invoked and displayed on the touchscreen 138. The context-sensitive menu may be cancelled or closed by touching anywhere on the touchscreen 138. The context-sensitive menu is overlay or pop-up overlaying a portion of the current pinnable VUI screen. The context-sensitive menu comprises a plurality of options which depend on the pinned item. The plurality of options may include one or a combination of "Delete", "Visit", "Search", "Download", "Share", "Copy" and "Play" or "Pause". The "Play" or "Pause" options may only be available when the pinned item is a video or music. For another example, the "Visit" option may only be available when the pin was created from an application different from the active application. The "Search" option may only be available when the pinned item is word(s) or an image, and selecting the "Search" option causes an internet search for the word(s) or image. The "Share" option causes pin or the pinned content to be shared with one or more other applications on the computing device 102.

Selecting the "Delete" option via corresponding input, such as touch or tap selecting the "Delete" option from the context-sensitive menu, causes the pin and the corresponding pinned object to be deleted. It will be understood that a touch or tap is differentiated from a long press by the computing device 102 by the duration of the touch input. When the touch duration is less than a threshold, the input is interpreted as a touch or tap. When the touch duration is equal to or exceeds the touch duration, the input is interpreted as a long press.

Selecting the "Visit" option via corresponding input, such as touch or tap selecting the "Visit" option from the context-sensitive menu, causes the computing device 102 to switch the active (or foreground) application to the source application from which the corresponding pinned object was pinned and optionally to the pinnable VUI screen in the source application and optionally the location within the pinnable VUI screen in the source application where the pinned object is located. If the source application was not running in the background when the "Visit" option is involved, the source application is launched or invoked. For example, it the pinned item was created from a website, the "Visit" option will launch or invoke a browser if not already open and open the corresponding website Uniform Resource Locator (URL). If the pinning source location cannot be located, an error message indicating that "pinning source is not available or removed" will be displayed. The pinning source maybe another application. If the instance of application is not available when the "Visit" option is selected, a screenshot for the content may optionally be shown.

Alternatively, at least some of the options in the context-sensitive menu, or other actions, may be selected and invoked in response to corresponding touch gestures in association with the respective pin. An action associated with stored content corresponding to a pin is performed in response to detection of corresponding input associated with the respective pin. For example, detection of a double tap on a pin (i.e., two taps on a touch area associated with a pin within a threshold duration) or a swipe/drag gesture with an initial contact point on a pin and a travel direction towards, or an end point proximate to, a center of the VUI screen may be cause the "Visit" option to be selected and the corresponding source of the respective pin to be visited.

In some examples, the location of the pins in the pin holder may be interpreted by an application program 152 to have a logical or semantic meaning based on predefined visual layout rules stored in memory 112. The predefined visual layout rules may be defined by the pinning application 170, an application program 152 which uses the pinning application 170 as an API, or the operating system software 150. The meaning may vary based on the application program 152 and/or the context, state or mode of the application program 152. Table 1 below provides an example of pin position interpretation when the active or foreground application is being used for document composition.

TABLE 1

Pin Position Interpretation

| Placement | Interpretation |
| --- | --- |
| Pin at top | Becomes header of the content |
| Pins placed parallel to each other on the left and right side | Pinned content becomes a two-column (double column) layout |
| Pin at bottom | Becomes footer of the content |
| Order of pins | Order of content |
| Pin on left | Left aligned |
| Pin on right | Right aligned |
| Pin size greater than threshold | Center aligned covering the region |
| Two pins overlapped | Content merged in order of overlap to form a single entity |
| One pin inside other position | One content inside other based on |

The predefined visual layout rules are interpreted by an application program 152 for dynamic content generation, for example, during the creation or editing of an electronic document, sometimes referred to as a document under composition. The electronic document may be an electronic message, a word processing document, a presentation document, or other suitable type of electronic document. Examples of an electronic message include an email message, Multimedia Messaging Service (MMS) message (also known as a PXT, a picture message, or a multimedia message), an instant message, a social media post, a blog post, and similar types of electronic messages.

In some examples, the size of the pins may be interpreted by an application program 152 to have a logical or semantic meaning based on predefined visual layout rules stored in memory 112. In some examples, larger pins may cause the pinned objects to a larger relative size and occupy more space when added to an input field compared with smaller pins. The input field may be, for example, an input content area such as a document content area (also known as a body) of a document under composition such as an electronic message.

In some examples, pins are initially generated with an initial default size and may be increased, for example, by performing a pinch gesture on, or in association with, the corresponding pin. The size of objects added to the document content area may be increased relative to the size of the original pinned object when the size of the corresponding pin is increased from the initial default size or increased relative to the size of the original pinned object when the size of the corresponding pin is decreased from the initial default size. The amount of the resizing of the object added to the document content area may be proportional to the amount of the resizing of the pin.

The content generation is dynamic in that it does not have a fixed layout or static content. Based on the predefined visual layout rules, pinned content and the pin size and/or position, the content composition and layout may be changed. The content generation is also dynamic in that electronic documents may be created or edited 'on the fly'. Based on changes in the pinned content and the pin size and/or position, the electronic document layout and content changes dynamically.

Figure 9:
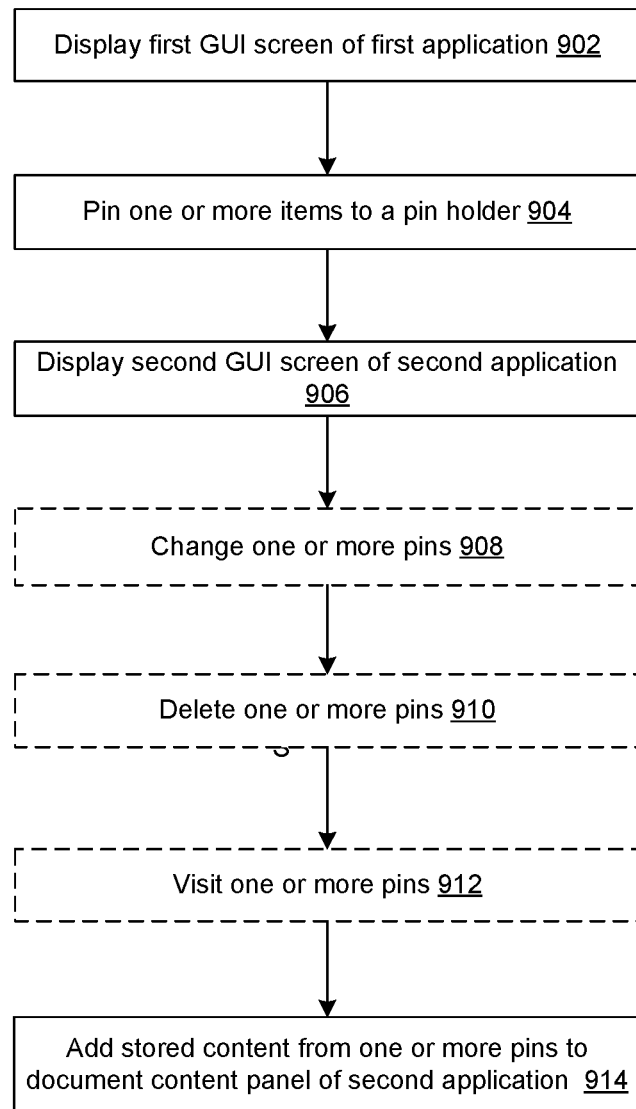
FIG. 9 is a flowchart illustrating a method of managing user interface items in a VUI in accordance with a further embodiment of the present disclosure.

FIG. 9 is a flowchart illustrating a method 900 of managing user data items in a VUI in accordance with one embodiment of the present disclosure. The method 900 may be carried out by software such as the pinning application 170 executed, for example, by at least the processor 104 of the processing system of the computing device 102 illustrated in FIG. 1. The method 900 is similar to the method 300 and 700 in that items may be pinned to a pin holder but allows pinned UI items to be used across different application programs 152, thereby providing the pinnable clipboard.

At operation 902, a first pinnable VUI screen associated with a first application is displayed on the touchscreen 138 for example, in response to invoking or launching the first application, or a change in the active or foreground application to the first application. The first pinnable VUI screen occupies the entire display area of the touchscreen 138 in the shown example. The first application may be a browsing, reading or viewing application in which content may be discovered by a user, such as a Web browser for web content, news application for news, social media application for social media posts, or the like. The first pinnable VUI screen comprises a dynamic content area having one or more selectable UI items. The first pinnable VUI screen also comprises one or more pin holders. In the described embodiment, the pin holders in the form of vertically extending areas are located at the left and right sides of the first pinnable VUI screen as shown in FIG. 8A. Other type configurations for the pin holder(s) may be used in other embodiments. A user may browse content in the dynamic content area. For example, the dynamic content area may be a scrollable area such as a Web page which may be browsed by scrolling in response to scrolling input.

At operation 904, one or more selectable UI items are pinned to one or more of the pin holders 801a and 801b via a pinning command, each pinning command being detected by the pinning application 170. A pinning command is a designated interaction performed by a user in association with selected content. The selected content may comprise a picture, video, audio, text, multimedia object, or other suitable logical object, or a combination thereof. In one example, a pinning command comprises the selection of a content in the form of a distinct UI item or region of interest (ROI) by a long press followed immediately by a drag gesture in which the selected content is moved to the pin holder. A selection marker is displayed to provide visualization of the selected content. The selection marker may be adjusted, either moved or changed in size (e.g., increased or decreased) in accordance with corresponding touch interaction, for example, by dragging the selection marker or ends thereof. The drag gesture has an initial or origin point in the touch area of the content area and an end point in the touch area of the pin holder. The collision of the touch point with the border of the pin holder may trigger the pinning command. Alternatively, a swipe gesture may be used instead of a drag gesture.

In another example, a long press on the selected content is used to invoke a context-sensitive menu including the option "Pin". The context-sensitive menu is overlay or pop-up overlaying a portion of the current pinnable VUI screen. The context-sensitive menu may include other options such as "Copy", "Select", "Select All", etc. The "Copy" option copies the selected content to memory, for example, to the clipboard. In response to selection of the "Pin" option from the context-sensitive menu, a moveable onscreen indicator, such as a caret, cursor or pointer, is displayed at the location of the selected content. The moveable onscreen indicator is draggable, and may be dragged to the pin holders 801*a* and 801*b* at the edge of the first pinnable VUI screen to pin it. The moveable onscreen indicator may take any suitable shape, such as a circle, ball or pin. The moveable onscreen indicator may be the same as the visual representation of a pin for the pin holders 801*a* and 801*b* including, optionally, preview information based on the selected content.

Other types of pinning commands are possible. For example, a pinning command may be a designated touch interaction with the touchscreen 138 performed by a user in association with selected content. The touch interaction of the pinning command may comprise one or more touch gestures performed in association with the selected content.

Pinning selected content in the method 900 to a pin holder 801*a* or 801*b* comprises copying the selected content to a clipboard (i.e., temporarily storing the selected content in memory), and displaying a pin corresponding to the selected content in the pin holder 801*a* or 801*b* at a location corresponding the end point of the pinning command. As described above in the context of methods 300 and 700, the pin is a visual indication of the selected content. The pin typically has a predefined shape and size. The pin may comprise identifying information identifying it as being associated with the pinned UI item. The pin may comprise a text label (e.g., letter, one or more words, or an index or item order number), a thumbnail image, a preview (e.g., the first word(s) of the text of the selected content and/or thumbnail image) or other identifying information associated with the selected content. The shape of the pin and nature of the identifying information may vary.

In examples in which the location or size of pins have a logical or semantic meaning, the pinning application 170 may maintain a data structure for an input field, for example a document content area such as a document under composition. The data structure defines a visual representation or layout of the document content area and is stored in memory 112. The selected content corresponding to each pin is stored in memory 112 in a data structure for future retrieval when the selected content is pinned to one of the pin holders 801*a* or 801*b*, or the "Pin" option is selected.

When a pin is added to one of the pin holders 801*a* or 801*b*, or when a pin is moved within or between the pin holders 801*a* or 801*b*, the location of the pin (in pixels) within the pin holder 801*a* or 801*b* and with respect to other pins is determined, and a visual relationship between the pinned content is generated based on the predefined visual layout rules of stored in memory 112, for example, in the pinning application 170. The location of the pins may be determined by a center or centroid of the pins.

As noted above, the predefined visual layout rules are interpreted by a visual interpreter (not shown) which forms part of the pinning application 170, an application program 152 which uses the pinning application 170 as an API, or the operating system software 150. The visual interpreter loads the predefined visual layout rules on initialization and interprets the visual layout of the document content area based on pin locations, the predefined visual layout rules, and the stored content in response to the addition of a pin, a change to an existing pin (e.g., movement or resizing) or deletion of an existing pin. Alternatively, the visual interpreter may interpret the visual layout of the document content area in response to unpinning a pinned item or adding/inserting the stored content associated with a pin into the document content area.

The visual interpreter may also retrieve the stored content corresponding to the current pins from memory 112 to render and display for a short time interval a mini-preview of the visual representation or layout of the document content area based on the current location and/or size of the pins each time that a pin is added or moved. The mini-preview depends upon the currently pinned items. The visual interpreter generates the mini-preview based on location of currently pinned items and the semantic meaning of the locations of pins. As pinning enables the composition of a virtual document on the fly, the mini-preview enables a preview of the virtual document.

The mini-preview may be a thumbnail image of the document content area presented as overlay or pop-up overlaying a portion of the current VUI screen. The portion of the screen occupied by the mini-preview may be 20% or less, 15% or less, or possibly 10% or less of the current VUI screen. The mini-preview may be displayed at the location that a pin was added or the location to which a pin was moved or resized. The short time interval for which the mini-preview is displayed before being removed may be for example, 5 seconds or less, or 2-3 seconds or less. Thus, in examples in which the location and/or size of pins have a logical or semantic meaning, pinning selected content may comprise displaying a mini-preview of the visual representation or layout of the document content area based on the current location and/or size of the pins.

At operation 906, a second pinnable VUI screen is displayed on the touchscreen 138 in response to a change in the active or foreground application from the first application to a second application. The second pinnable VUI screen occupies the entire display area of the touchscreen 138 in the shown example. The first pinnable VUI screen and second pinnable VUI screen are distinct and separate pinnable VUI screens. The change in the active or foreground application is made in response to the detection of corresponding input to switch the active or foreground application. The second application has a document composition mode and the second pinnable VUI screen is a document composition screen. The second application may be an electronic messaging application in which electronic messages such as an email, text message, instant message, post, or the like may be composed. Alternatively, the second application may be a document creation application for creating documents, such as a word processing application.

At operation 908, a change to one or more pins is optionally made in response to the detection of corresponding input such as drag gesture used to move a pin or a pinch gesture to change the size of a pin. Thus, in examples in which the location or size of pins have a logical or semantic meaning, changing a pin location or size may comprise displaying a mini-preview of the visual representation or layout of the document content area based on the current location and/or size of the pins. Although changes to a pin is shown after switching to the second application and when the second pinnable VUI screen is displayed, changes may occur at any time while the pin remains pinned to one of the pin holders 801*a* or 801*b*.

At operation 910, one or more pins are optionally deleted in response to the detection of corresponding input such as selecting the "Delete" option from the context-sensitive menu invoked by selecting a pin pinned to one of the pin holders 801*a* or 801*b* using a long press or other suitable touch gesture. The "Delete" option may be selected from the context-sensitive menu by a touch or tap associated with the "Delete" option displayed in the context-sensitive menu.

At operation 912, one or more pins are optionally visited in response to the detection of corresponding input such as selecting the "Visit" option from the context-sensitive menu invoked by selecting a pin pinned to one of the pin holders 801*a* or 801*b* using a long press or other suitable touch gesture. The "Visit" option may be selected from the context-sensitive menu by a touch or tap associated with the "Visit" option displayed in the context-sensitive menu.

At operation 914, the stored content associated with one or more pins is added to the document content area via an unpinning command, each unpinning command being detected by the pinning application 170. An unpinning command is a designated interaction performed by a user in association with a selected pin. There may be multiple types of unpinning commands to provide multiple ways of adding stored content corresponding to pins to the second pinnable VUI screen of the destination application, providing flexibility to the user.

The stored content corresponding to all of the pins may be added to the document content area at the same time in a manner that would automatically arrange according to the predefined visual layout rules stored in memory 112. To add the stored content corresponding to all of the pins at the same time, the user invokes a context-sensitive menu via corresponding input such as a long press. The context-sensitive menu is invoked and displayed on the touchscreen 138 in response to detection of a long press on or in association with a document content pane (or area) of the second pinnable VUI screen. The context-sensitive menu may be cancelled or closed by touching anywhere on the touchscreen 138. The document content pane is the area of the second pinnable VUI screen on the interior that is bounded by the pin holders 801*a* or 801*b*. The context-sensitive menu comprises a plurality of options including "Place pins" and "Place selected pins" when one or more pins are selected. When no pins are selected, the plurality of options include only the "Place pins" options for placing pins. Selecting the "Place selected pins" option via corresponding input, such as touch or tap selecting the "Place selected pins" option from the context-sensitive menu, causes the stored content corresponding to all of the pins to be added to the document content area at the same time in a manner that automatically arranges the stored content according to the predefined visual layout rules. The pins are then deleted.

The stored content corresponding to a subset of the pins may be added to the document content area at the same time in a manner that would automatically arrange according to the predefined visual layout rules stored in memory 112. The subset may comprise one or more pins. To place a subset of pins, the user selects the desired pins. When the context-sensitive menu is invoked and displayed, all of the pins may be selected by default and to place a subset of pins, the user unselects the undesired pins from the selected pins. Alternatively, in other examples none of the pins may be selected by default and the user must select the desired pins to be placed. Each selected pin may be indicated by an onscreen selection marker, such as a halo or highlighting that surrounds the corresponding pin. The user may select and unselect pins via corresponding input such as a touch or tap associated with the corresponding pin. Selecting the "Place pins" option via corresponding input, such as touch or tap selecting the "Place pins" option from the context-sensitive menu, causes the stored content corresponding to all pins to be added to the document content area at the same time in a manner that automatically arranges the stored content according to the predefined visual layout rules. The pins are then deleted.

The stored content corresponding to an individual pin may be added to the document content area at a location specified by a user via drag gesture in which the end point of the drag gesture specifies the location at which the stored content is added. The size of the stored content in the document content area may be automatically determined according to the predefined visual layout rules even though the location was set by the user by the drag gesture. Alternatively, a swipe gesture may be used instead of a drag gesture. Other types of unpinning commands are possible.

Unpinning stored content in the method 900 to an input field (e.g., document content area) comprises added the stored content corresponding to a pin from the clipboard (i.e., temporary storage in memory) to the input field (e.g., document content area) and removing (or deleting) the pin corresponding to the stored content.

If the document content area already contains some content in the document content pane, the visual interpreter generates one or more pins at corresponding locations for the existing content using a different visualization style compared with pins generated by the user for easy differentiation. For example, pins generated by the visual interpreter based on existing content in the document content pane may be shown in a different color so that the user may adjust other pins with respect to the already existing content.

Other types of unpinning commands are possible. For example, designated touch gestures or other input interactions may be used instead of the context-sensitive menu as described above.

Figure 10A:
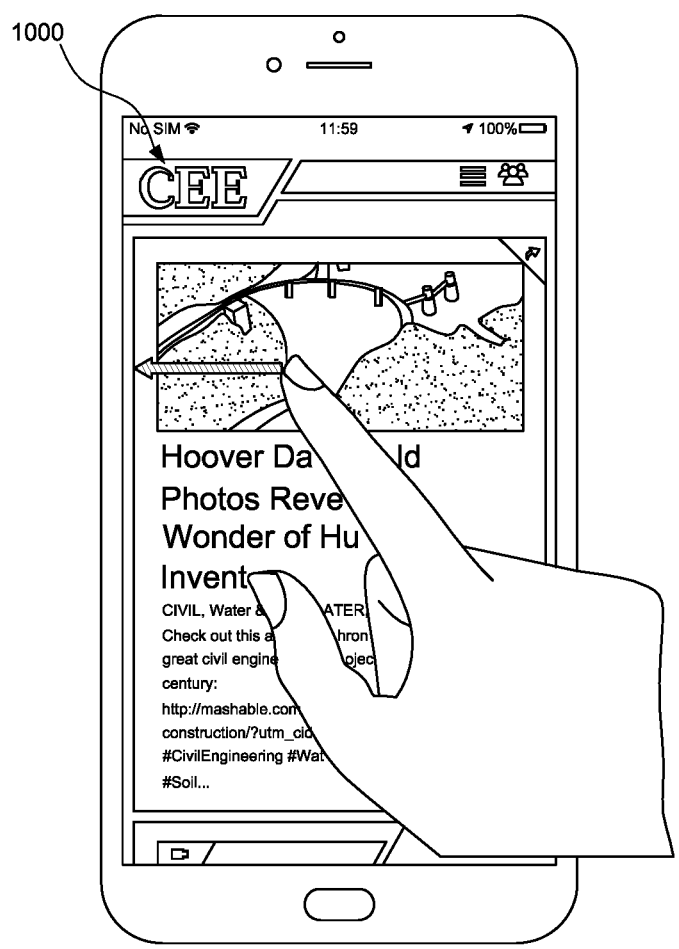
FIGS. 10A-10F illustrate a sequence of pinnable VUI screens in accordance with an example of a user interaction utilizing the method of FIG. 9.
Figure 10B:
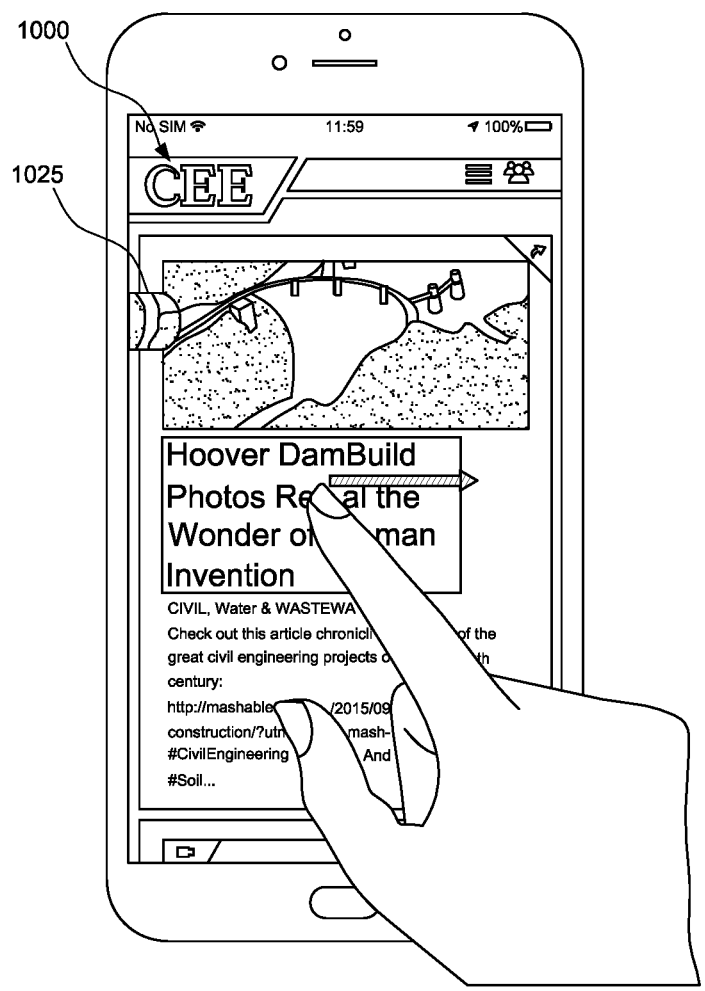

Referring now to FIGS. 10A-10F, a sequence of pinnable VUI screens in accordance with an example of a user interaction utilizing the method of FIG. 9 will be described. In FIG. 10A, a first pinnable VUI screen 1000 of a first application is displayed on the touchscreen 138. The first application is a Web browser and the first pinnable VUI screen 1000 is a Web page with dynamic content comprising images and text displayed by the Web browser. The user selects an image of "Hoover Dam" and swipes left to pin the selected image to a left-side pin holder located at the left edge of the displayable area of the touchscreen 138 and the first pinnable VUI screen 1000, which is not shown and invisible to the user. As shown in FIG. 10B, a first pin 1025 is generated in the first pinnable VUI screen 100 and located on the left-side pin holder at a location proximate to the image at the time of pinning. The first pin 1025 comprises a preview of the pinned image within a reticule shaped like a tab or pin.

Figure 10C:
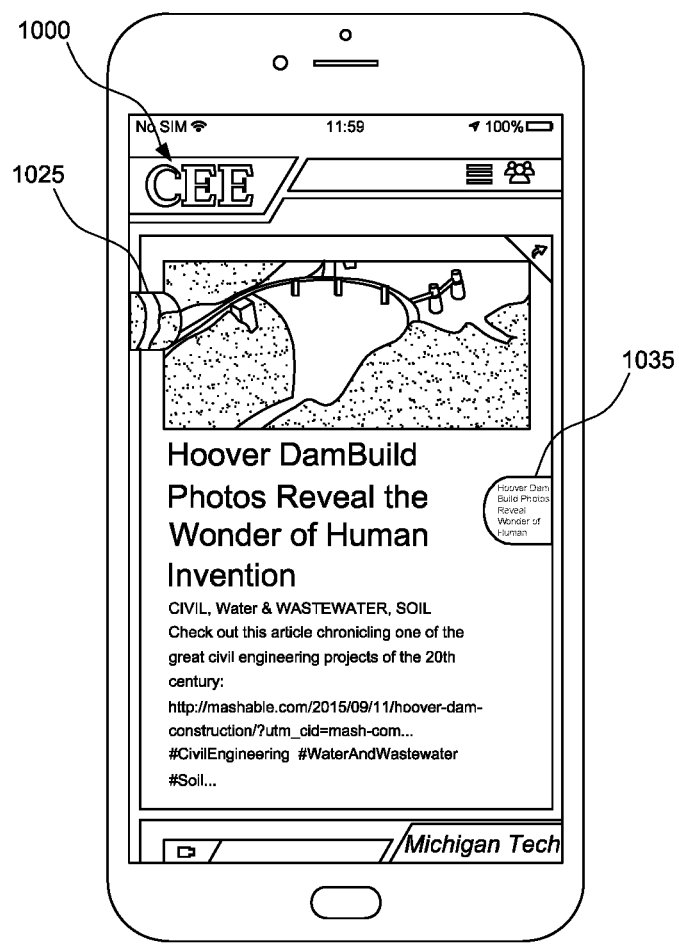

In FIG. 10B, the user interacts with the first pinnable VUI screen 1000 and selects text in the form of a title of the Web page "Hoover Dam Build Photos Reveal the Wonder of Human Invention" and swipes right to pin the selected text to a right-side pin holder located at the right edge of the displayable area of the touchscreen 138 and the first pinnable VUI screen 1000, which is not shown and invisible to the user. As shown in FIG. 10C, a second pin 1035 is generated and located on the right-side pin holder at a location proximate to the text at the time of pinning. The second pin 1035 comprises a preview of the pinned text within a reticule shaped like a tab or pin.

Figure 10D:
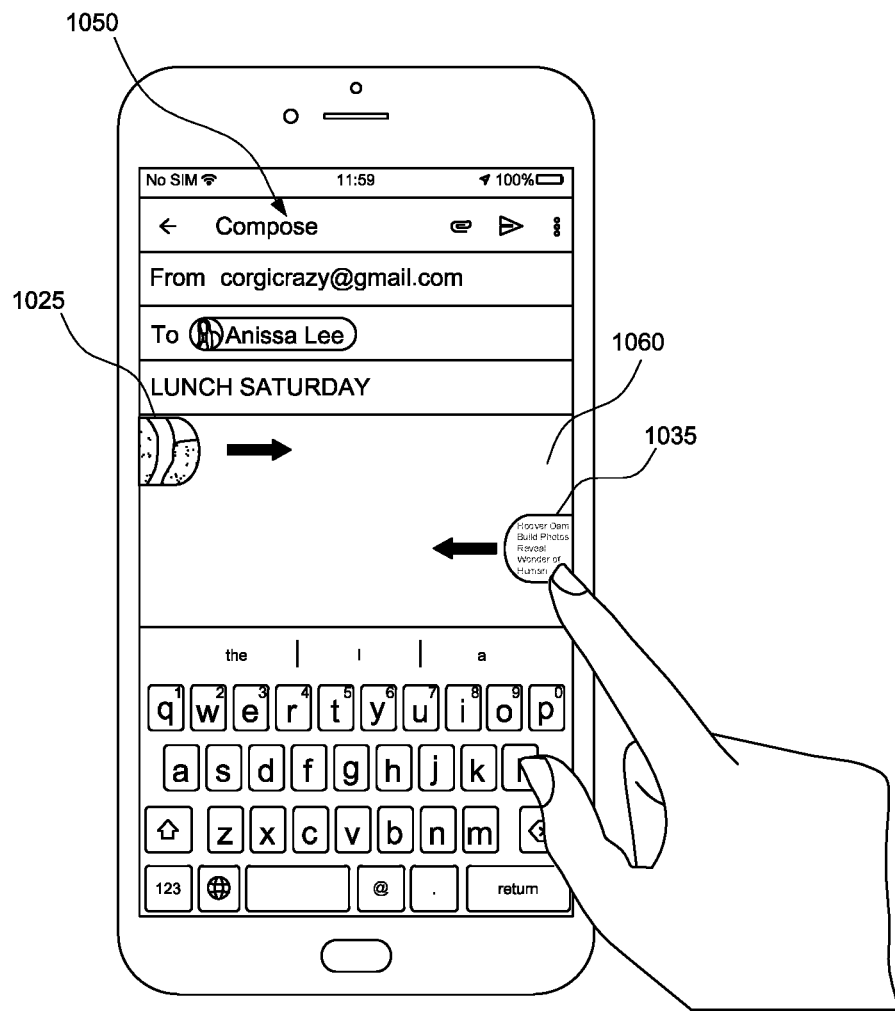

In FIG. 10D, the user interacts with the first pinnable VUI screen 1000 to switch from the Web browser to a second application in the form of an email messaging application and a second pinnable VUI screen 1050 is displayed. The second pinnable VUI screen 1050 comprises an input field 1060 such as an input content area or document content area. The left-side and right-side pin holders persist between the first and second pinnable VUI screens 1000, 1050 between the first and second applications. The state of the left-side and right-side pin holders, including the location and size of the pins located on the left-side and right-side pin holders, also persists between the first and second pinnable VUI screens 1000, 1050 between the first and second applications. The stored content corresponding to the first pin 1025 may be added to the input field 1060 by swiping right. The stored content corresponding to the second pin 1035 may be added to the input field 1060 by swiping left.

Figure 10E:
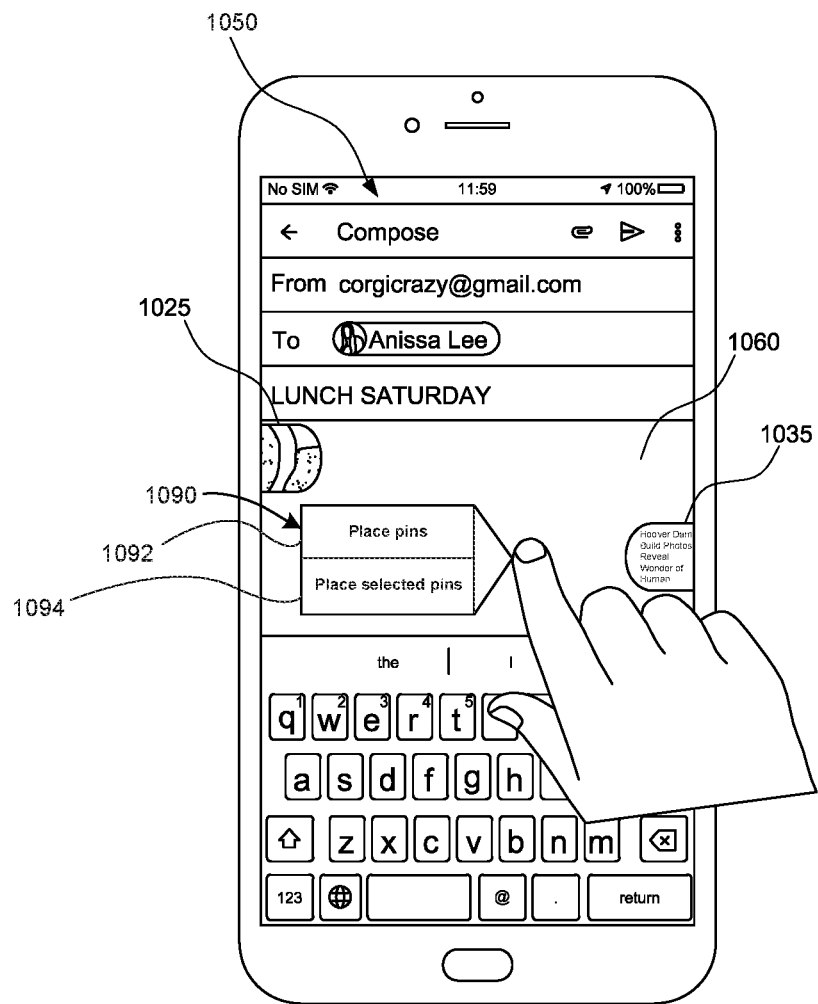
Figure 10F:
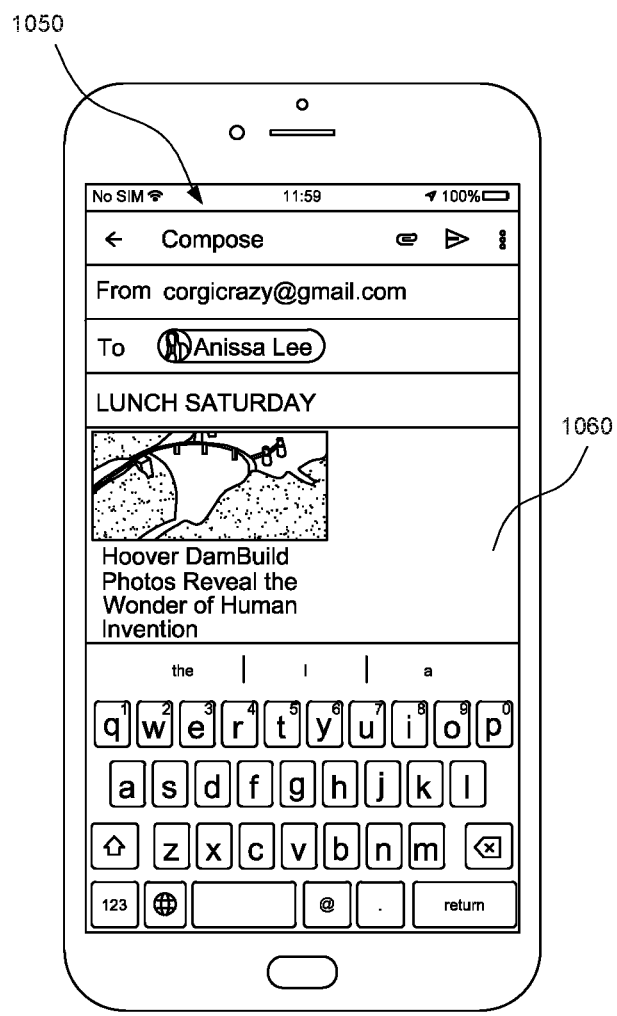

Alternatively, as shown in FIG. 10E the stored content corresponding to the pins 1025, 1035 may be added to the input field 1060 by invoking a context-sensitive menu 1090 via corresponding input as described above, and selecting one of the menu options "Place Pins" 1092 or "Place selected pins" 1094. Alternatively, the stored content corresponding to the pins 1025, 1035 may be added to the input field 1060 individually. In FIG. 10F, the stored content corresponding to the pins 1025, 1035 has been added to the input field 1060.

The fourth embodiment provides an interaction method in which content (e.g., images, videos, text, multimedia, or other data etc.) may be collected and organized into discrete parts from one or multiple different sources on a browsable visual user interface during a discovery phase of the interaction method, and later added to an input field (e.g., input content area or document content area) during a composition phase of the interaction method to create a structured composition in a least number of interaction steps. Selected content may be pinned at one or more edge(s) of the VUI screen via corresponding input referred to as pinning. Pinning creates draggable objects called pins which link to stored content. A variety of operations may be performed on pins such as visit source, delete, change position, web search, etc. The stored content may be added to a document such as an email, text, instant message, or word processing document, or the like. The stored content for all pins may be placed at the same time, the stored content for a subset of pins may be placed at the same time, or the stored content may be placed one pin at a time. The location and/or size of the pins may be interpreted to have a logical or semantic meaning that may be used to automatically arrange the stored content based on predefined visual layout rules. If content pane of the document in which the stored content is being added already has some content, it is presented as one or more pins at corresponding locations using a different visualization style (e.g., different color) so that other pins may be arranged by a user with reference to the existing content.

Although the methods 300, 700 and 900 have been described separately, features from the methods may be combined in ways appreciated by persons skilled in the art. For example, the performance of the list operation in the method 700 of FIG. 7 may be performed in the method 300.

At least some of the above-described embodiments provide a method of managing user interface items in a VUI that: allows a user to naturally scroll the list for repositioning, resulting in a faster, more efficient, more intuitive and improved user experience; allows the repositioning of multiple items at once, resulting in a faster, more efficient and improved user experience; allows the user to complete the repositioning task when desired, thereby eliminating the temporal demand provided by existing solutions in which the user has to continuously hold the moving item until interaction is complete and resulting in an improved user experience; and allows more accurate repositioning (e.g., unpinning or inserted of pinned items) compared with currently available techniques in which the next visible item is not known to the user (hence, user misses the target very frequently), resulting in a faster, more efficient, and improved user experience.

At least some of the above-described embodiments provide a method of managing user interface items in a VUI that allows reusability or easy transfer of content across applications and reduces the time required to switch between screens and regenerate the content from one application in another application.

Although the described embodiments are in the context of touch gestures detected by a touchscreen, the teachings of the present disclosure are not limited to touch interfaces but may be extended to other modalities in which content is displayed on the other types of display devices and to other input devices/methods. For example, the teachings of the present disclosure may be directed towards other computing devices having a computer mouse (or other navigational tool/pointing device) as an input device or which use motion gestures as an input method and which use other types of display devices for presenting a VUI including, without limitation, a personal computer having a conventional non-touchscreen display and augmented reality (AR) and/or virtual reality (VR) headsets having a head device mounted display such as a pair of googles, a visor, or smart glasses. A pinnable VUI is displayed on the respective display screen. Alternatively, in the context of AR/VR modalities, a pinnable VUI may be projected onto a surface or the user's retina. Examples of how VUI elements are selectable and pinnable using gestures based on the input modality are described below.

With respect to computer mouse interaction, pinning and unpinning may be performed using left and right clicks of the computer mouse. The computer mouse may be used for simulating touch interaction by using a left-click (i.e., key press of a left button of the computer mouse) for the start point of the interaction, scrolling action using a scroll wheel of the computer mouse for the travel distance of the interaction, a right-click (i.e., key press of a right button of the computer mouse) for invoking a contextual menu, a left-click for selection. The dragging of VUI components may be performed by a left or right-click followed by moving the position of the computer mouse.

With respect to AR/VR, interactions may be performed using motion gestures such as mid-air gestures which are detected using computer vision system configured to detect and track the body position of a user using known computer vision techniques. The computer vision system may be based on one or a combination of images from a camera and point cloud positional data from a detection and ranging (DAR) system. Gesture recognition software may be provided by the AR/VR head device mounted display. The gesture recognition software receives data such as images captured by a camera of the head device mounted display that capture the user interaction with a virtual display screen and process the images to recognize a gesture performed by the user. For example, an open-hand or pinch-open gesture may be used for pointing and a close-hand/fist or pinch-close gesture may be used for selection. A close-hand/fist or pinch-dose gesture may while moving the hand may be used for the dragging of VUI components. A dwell on close-hand/fist or pinch-close gesture may be used to invoke a contextual menu. Alternatively, touch gestures performed with respect to a touchscreen may be substituted, for example, with eye gestures performed with the eye and detected with ocular sensors or motion gestures performed with a hand and detected with motion sensors (such as positional, proximity and/or acceleration sensors) embedded in a user worn glove, sleeve, band or similar garment worn by the user.

In one example AR application, a user may pin real-world objects captured by smart glasses to the edge of the visual area of the smart glasses and later insert the pinned objects in a different scene captured by the smart glasses and viewed by the user as an AR object corresponding to the pinned real-world. Pinning real-world objects may comprise generating an AR object to be pinned by performing object edge detection at a location corresponding a pinning gesture performed by the user and generation of a visual representation of the object at the location as the AR object.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, central processing units (CPUs), neural processing units (NPUs), tensor processing units (TPUs), hardware accelerators, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of managing user interface items in a visual user interface (VUI) performed by a processor of a computing device, the method comprising:
   displaying on a display a first VUI screen of a first application, the first VUI screen comprising a dynamic content area comprising selectable content, the first VUI screen providing a first pin holder located at a first side of a display area of the first VUI screen and a second pin holder located at a second side of the display area of the first VUI screen opposite to the right side, wherein the first pin holder and the second pin holder persist across VUI screens of a different applications;

pinning selected content from the dynamic content area to the first pin holder or second pin holder in response to detection of a pinning command, wherein pinning comprises
   displaying on the display a pin in a corresponding one of the first or second pin holders, and
   storing the selected content in association with the pin in a memory of the computing device;
displaying on the display a second VUI screen of a second application in response to detection of input switching the active application from the first application to the second application, wherein the second VUI screen includes an input field, wherein the state of the first pin holder and the second pin holder persists between the first VUI screen of the first application and the second VUI screen of the second application; and
adding stored content corresponding to one or more pins located in the first or second pin holders to the input field in response to detection of an unpinning command.

2. The method of claim 1, wherein the first pin holder is located at a left edge of the dynamic content area and the second pin holder is located at a right edge of the dynamic content area.

3. The method of claim 1, wherein the dynamic content area of the first VUI screen and the input field of the second VUI screen are scrollable in a vertical direction relative to a screen orientation, wherein the first pin holder and second pin holder are defined by a vertically extending area at the left edge of the display area of the display and right edge of the display area of the display.

4. The method of claim 1, wherein the first pin holder and second pin holder are provided without a visual representation.

5. The method of claim 1, wherein the stored content corresponding to the one or more pins is automatically arranged according to predefined visual layout rules based on a location of the one or more pins in the first or second pin holders.

6. The method of claim 1, wherein the stored content corresponding to the one or more pins is automatically arranged according to predefined visual layout rules based on a size of the one or more pins in the first or second pin holders.

7. The method of claim 1, wherein the state of the first pin holder and the second pin holder comprises a location of pins located on the first pin holder and the second pin holder.

8. The method of claim 1, wherein the state of the first pin holder and the second pin holder comprises a size of pins located on the first pin holder and the second pin holder.

9. The method of claim 1, wherein the state of the first pin holder and the second pin holder persists in response to changes in a visual state of the dynamic content area and persists across applications.

10. The method of claim 1, further comprising:
   invoking a context-sensitive menu in response to corresponding input associated with a selected pin, wherein the context-sensitive menu comprises a plurality of menu options; and
   performing an action in response to input selecting an option in the plurality of menu options.

11. A method of managing user interface items in a visual user interface (VUI) performed by a processor of a computing device, the method comprising:
   displaying a VUI screen on a display, the VUI screen comprising a scrollable area comprising a plurality of selectable items, the VUI screen providing a pin holder located at an edge of a display area of the display, wherein the state of the pin holder and the second pin holder persists in response to changes in a visual state of the scrollable area;
   pinning a selected item in the plurality of selectable items to the pin holder in response to detection of a pinning command;
   changing a visual state of the scrollable area in response to detection of corresponding input; and
   unpinning a pinned item corresponding to a selected pin from the pin holder in response to detection of an unpinning command.

12. The method of claim 11, wherein the pinning comprises:
   displaying a pin corresponding to the selected item in the pin holder proximate to a location of the selected selectable item;
   storing the selected item in association with the pin in a memory of the computing device;
   removing the selected item from the scrollable area; and
   displaying an additional item.

13. The method of claim 11, wherein the unpinning comprises:
   adding the stored item corresponding to the selected pin to the scrollable area at a position in the scrollable area corresponding to a position of the selected pin;
   removing a currently displayed item in the scrollable area to accommodate the added item; and
   removing the selected pin from the pin holder.

14. The method of claim 11, wherein the selectable items are ordered and arranged in a sequence and the additional item that is displayed is a subsequent item in the sequence.

15. The method of claim 11, wherein the unpinning comprises:
   inserting the stored item corresponding to the selected pin to the scrollable area at a position in the sequence corresponding to a position of the selected pin;
   removing a currently displayed item in the sequence to accommodate the inserted item;
   removing the selected pin from the pin holder.

16. The method of claim 15, wherein the currently displayed item that is removed is a last item in the sequence.

17. The method of claim 15, wherein the stored item is inserted before the item in the sequence proximate to the position of the pin.

18. The method of claim 10, further comprising:
   repositioning a pin in the pin holder in response to detection of repositioning input.

19. The method of claim 11, wherein changing the visual state of the scrollable area comprises:
   scrolling the scrollable area in response to detection of scrolling input.

20. The method of claim 11, wherein changing the visual state of the scrollable area comprises:
   performing a list operation on the selectable items the scrollable area in response to detection of corresponding input.

* * * * *